United States Patent
Tsujimoto

(10) Patent No.: US 7,390,434 B2
(45) Date of Patent: Jun. 24, 2008

(54) METHOD AND APPARATUS FOR PRODUCING FILM FROM POLYMER SOLUTION, AND OPTICAL POLYMER FILM

(75) Inventor: Tadahiro Tsujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 351 days.

(21) Appl. No.: 10/830,096

(22) Filed: Apr. 23, 2004

(65) Prior Publication Data

US 2004/0212892 A1    Oct. 28, 2004

(30) Foreign Application Priority Data

Apr. 25, 2003  (JP) .............................. 2003-122286

(51) Int. Cl.
*C09K 19/52* (2006.01)
*C09K 19/00* (2006.01)

(52) U.S. Cl. .................... 252/299.01; 430/20; 430/449; 428/1.1; 428/1.2; 438/778; 438/781; 349/1; 349/2; 349/187; 349/193

(58) Field of Classification Search ............ 252/229.01; 430/20, 449; 428/1.1, 1.2; 438/778, 781; 349/1, 2, 187, 193
See application file for complete search history.

(56) References Cited

U.S. PATENT DOCUMENTS

| | | | |
|---|---|---|---|
| 5,637,359 A * | 6/1997 | Fukuchi et al. ............ 428/1.26 |
| 5,646,703 A | 7/1997 | Kamada et al. | |
| 5,805,253 A | 9/1998 | Mori et al. | |
| 5,993,530 A * | 11/1999 | Tanaka et al. ............ 106/206.1 |
| 7,141,304 B2 * | 11/2006 | Yamada et al. ............ 428/447 |
| 2004/0105994 A1 * | 6/2004 | Lu et al. .................... 428/515 |
| 2006/0167201 A1 * | 7/2006 | Yamada et al. ............ 528/25 |

FOREIGN PATENT DOCUMENTS

| JP | 10-054982 A | 2/1998 |
|---|---|---|
| JP | 2866372 B2 | 12/1998 |
| JP | 2002-234042 A | 8/2002 |

\* cited by examiner

*Primary Examiner*—Geraldina Visconti
(74) *Attorney, Agent, or Firm*—Sughrue Mion, PLLC

(57) ABSTRACT

A dope containing cellulose acylate as a main content of polymer is cast on a front surface of a moving belt in a method of producing a film from a solution. A drying apparatus is confronted to a back surface of said belt to evaporate a solvent in the gel-like film. Further, a condensers are confronted to a cast surface of said gel-like film to condense a solvent vapor for recovery. A wind speed above and near the gel-like film is from 0.01 m/s to 0.5 m/s, and the belt is transported downwards at the casting position PS. When d (mm) is a distance between the casting surface and each condenser, Tw (° C.) is a temperature of each condenser, and Ts (° C.) is a temperature of the casting dope, conditions are satisfied: $Q=(Ts-Tw)/d$ and $5<Q<100$. The obtained film is excellent in thickness uniformity and optical properties, and therefore adequate for the optical film.

22 Claims, 10 Drawing Sheets

METHOD AND APPARATUS FOR PRODUCING FILM FROM POLYMER SOLUTION, AND OPTICAL POLYMER FILM

BACKGROUND OF THE INVENTION

1. Field of the Invention

The present invention relates to an optical polymer film, a method and an apparatus for producing the a film, and more particularly to an optical polymer film with optical properties, a method and an apparatus for producing the optical polymer film, which is used as a protective film for a polarizing filter, in an optical functional film and in a liquid crystal display.

2. Description Related to the Prior Art

The liquid crystal display (hereinafter LCD) is constructed of a liquid crystal cell, a polarized element and an optical compensation sheet (birefringence sheet). In the transmittance type of the LCD, two polarized elements are provided in both sides of the liquid crystal cell, and one or two optical compensation sheet is disposed between the liquid crystal cell and the polarized element. In the reflection type of the LCD are superimposed a reflecting sheet, a liquid crystal cell, one optical compensation sheet, one polarized element in this order.

The liquid crystal cell is constructed of rod-like liquid crystal molecules, two substrates for including them, and electrode layers for applying an electric voltage to the rod-like molecules. There are several displaying mode types of the liquid crystal cell, which are used depending on situations of orientations of the liquid crystal molecules to be used. For example, as a transmitting type, there are TN (Twisted Nematic), IPS (In-Plane Switching), FLC (Ferroelectric Liquid crystal), OCB (Optically Compensatory Bend), STN (Super Twisted Nematic), VA (Vertically Aligned) and the like, and as a reflecting type, there are TN (Twisted Nematic), HAN (Hybrid Aligned Nematic) and the like. The polarizing element usually has a structure that two transparent protective films are attached to both surfaces of a polarized film.

Further, the optical compensation sheet is used in several liquid crystal displays for reducing the irregular coloring of the displayed image, or for enlarging the view angles. In the optical compensation sheet, a birefringent film which is obtained by stretching or drawing was priory used. Instead of the optical compensation sheet including the birefringent film, it is proposed in recent years to use the optical compensation sheet having optical anisotropy which liquid crystal molecules (especially discotic liquid crystal molecules) on the transparent substrate provides.

In order to provide the optical anisotropy, the orientation of liquid crystalline molecules are made and fixed. In this case, the liquid crystalline molecules have polymerizable groups, and the polymerization of the liquid crystalline molecules is performed for the fixing. The liquid crystalline molecules have large birefringence, and show several orientations. The utilization of these characters can provides the optical compensation sheet with optical properties, which could not obtain by using the prior birefringent film.

The optical properties of the optical compensation sheet are determined according to optical properties of the liquid crystal cell, concretely the above described displaying modes. Accordingly, when the liquid crystalline molecules, especially discotic liquid crystalline molecules, are used, the produced optical compensation sheet can have several optical properties corresponding to the displaying modes of the liquid crystal cell. The optical compensation sheets for several displaying modes, in which discotic liquid crystal molecules are used, are proposed in several patent applications. For example, Japanese Patent Laid Open Publication No. 6-214116, U.S. Pat. Nos. 5,583,679, 5,646,703 and German Patent Application Publication No. 3911620A1 teach an optical compensation sheet for the TN-mode liquid crystal cell. Japanese Patent Laid-Open Publication No. 10-54982 teaches the optical compensation sheet for the IPS-mode or FLC-mode liquid crystal cell. Further, U.S. Pat. No. 5,805,253 and International Patent Application No. 96/37804 teaches the optical compensation sheet for the OCB-mode liquid crystal cell & the HAN-mode liquid crystal cell, Japanese Patent Laid-Open Publication No. 9-26572 teaches the optical compensation sheet for the STN-mode liquid crystal cell, and Japanese Patent No. 2866372 teaches the optical compensation sheet for the VA-mode liquid crystal cell.

However, although there are several ways of orientations of liquid crystal molecules, and only the above anisotropies of the liquid crystal sometimes cannot optically compensate the liquid crystal cell. U.S. Pat. No. 5,646,703 supposes that both the liquid crystal molecules and the transparent substrate of the optical compensation sheet is provided with the optical anisotropy. Thus the liquid crystal cell is optically compensated.

It is extremely progressed to provide several functions with the above products for several optical uses. In this progress of the products for the optical use (such as these LCDs), it is necessary for the film constructing each layer of the product to have the thickness uniformly controlled with high accuracy and the uniformity of optical properties. For example, the thickness nonuniformity (or thickness-mura) in the protective film for a polarizing filter causes wrinkle which occurs when being attached to the polarizing element, a curled shape of the polarizing filter after attachment, and the like. Further, the optical film is coated with a hard coating layer for surface protection and an anti-reflection layer for preventing the reflection. The thickness nonuniformity often causes the non-uniform coating (or coating-mura). Especially, when the non-uniformity (or mura) cyclically occurs, the quality of images displayed by the LCD becomes extremely worse. Each Japanese Patent Laid-Open Publication No. 2002-234042 No. 2002-1745 teaches a solution casting method as a method of producing a film, in which the thickness uniformity is improved moreover.

However, recently, while the thinner thickness and the larger number of superposed films and the improvement of productivity are increasingly required, it is necessary to control the thickness of the film produced from the polymer with higher accuracy. Accordingly, the productivity is not enough improved and the produced film cannot have the uniform thickness and the uniform optical property. Further, when the optical properties, especially retardation values Re, Rth in birefringence are not uniform, the influence on the products is large. For example, the tinting and the inversion sometimes occur in the LCD, and when such an optical compensation sheet for enlarging view angle is used in the LCD, the change of the view angle and the color inversion sometimes occur.

SUMMARY OF THE INVENTION

An object of the present invention is to provide a method for producing a film in which nonuniformity of the thickness and birefringence of the optical film is reduced and the optical properties is excellent.

Another embodiment of the present invention is to provide an apparatus for producing a film in which nonuniformity of the thickness and birefringence of the optical film is reduced and the optical properties is excellent.

Still another object of the present invention is to provide an optical polymer film with optical properties adequate for optical use.

In order to achieve the object and the other object, in a method for forming a film of the present invention, at least one polymer solution discharged from a casting die is cast on a front surface of a moving substrate to form the film. The substrate is heated with use of a heater disposed along a back surface of the substrate. A solvent evaporated from a film is condensed with a condensing device disposed so as to closely confront to the film.

An apparatus for producing a film from a polymer solution of the present invention includes a movable substrate, a casting die for casting onto a surface of the moving substrate a polymer solution to form the film, and a heater provided so as to confront to a rear surface of the substrate. The heater heats the gel-like film through the substrate. The apparatus further includes a condensing device disposed so as to closely confront to the film. The condensing device condenses for recovery a solvent vapor generated from the film.

In the present invention, an optical polymer film comprises characteristics which satisfy following formulae:

$$MD1 \leq 0.10 \times TA1;$$

$$SP1_{MAX} \leq 0.10 \times TA1$$

wherein

TA1 is an average of first thickness values measured at plural measuring points arranged in a first direction on a surface of the polymer film, MD1 is an average of deviations of the plural first thickness values, and $SP1_{MAX}$ is a maximum of frequency spectrum SP1, which is obtained by Fast Fourier Transform of the first thickness values.

According to the method and the apparatus of producing the film from the polymer solution of the present invention, the nonuniformity of the thickness and birefringence are extremely reduced, and thus the produced optical polymer film can have excellent optical properties. A polarizing filter, a protective film, an optical functional film and a liquid crystal display in which the optical polymer film is used are excellent in optical properties.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

[Solution Casting Method]

Figure 1:
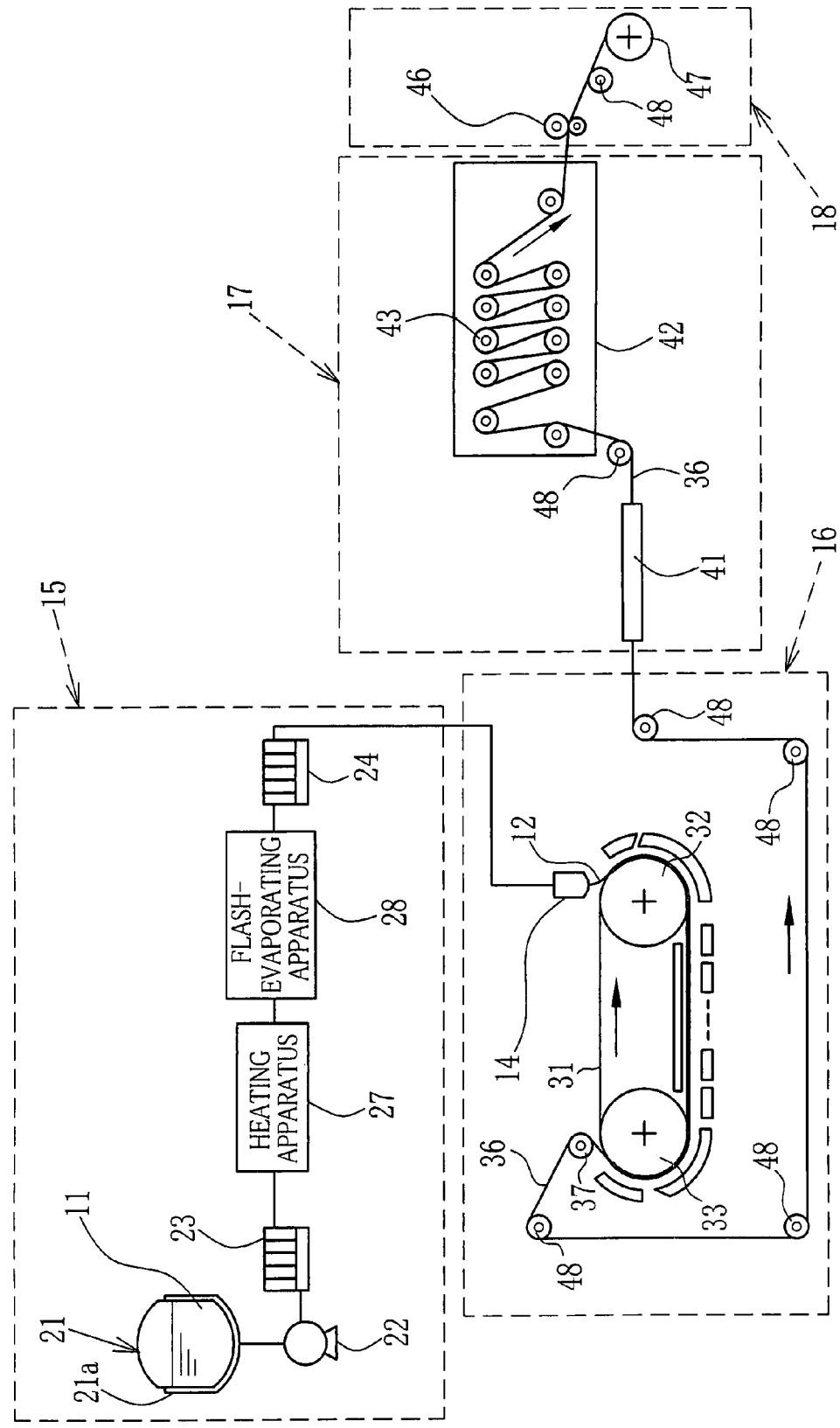
FIG. 1 is a schematic diagram of a film production process to which a solution casting method is applied as a method of producing a film from a polymer solution of the present invention.

In a following explanation, a dope means a polymer solution including a solution and a dispersion liquid in which polymers and several sorts of additives are dissolved or dispersed. Further, in FIG. 1, a prepared dope 11 is a dope which is prepared in a dope preparation process which will be described in following, and a casting dope 12 is obtained by varying the prepared dope 11 so as to be have adequate characters for casting.

Film production facilities are constructed of a dope preparing equipment 15, a casting equipment 16, a drying equipment 17 and a winding equipment 18. The dope preparing equipment 15 is constructed of a tank 21 into which the prepared dope 11 is supplied, a pump 22, first and second filtering apparatuses 23, 24, a heating apparatus 27, and a flash-evaporating apparatus 28 for performing the flash-evaporation.

The tank 21 is provided with a thermostat 21a and a thermometer (not shown) so as to adequately heat and cool the prepared dope 11. In the present invention, it is preferable to heat once, and then cool the prepared dope 11 such that the solubility may increase. Further, in the heating and the cooling, the temperature is set in consideration with sort of the dope, particularly composition of a solvent of the dope. Especially, when a mixture solvent is used as the solvent, it is preferable that that the prepared dope 11 is heated and cooled in a multi-step manner to predetermined temperatures.

The prepared dope 11 is fed at a predetermined flow rate to the casting equipment 16 by the pump 22. The first and second filtering apparatuses 23, 24 are disposed between the pump 22 and the casting die 14 so as to remove remaining solid materials contained in the prepared dope 11. Further, after the filtration with the first filtering apparatus 23, the prepared dope 11 is heated by the heating apparatus 27 provided on a feed pipe, and the flash-evaporation is made in the flash-evaporating apparatus 28. Note that the heating apparatus 27 may be disposed in upstream from the first filtering apparatus 23.

The flash-evaporating apparatus 28 is used for changing the characters of the prepared dope 11 into that of the casting dope 12 which is adequate for the casting. In the flash-evaporating apparatus 28, the prepared dope 11 whose pressure is high is flashed into an air of the atmospheric pressure to perform the flash-evaporation. The solvent vapor generated by evaporating the prepared dope 11 is usually condensed and removed with use of a condenser (not shown) and discharged as a recovery solvent from the film production facilities.

After the flash-evaporation, the prepared dope 11 is fed out from the flash-evaporating apparatus 28, and it is preferable that remaining solid materials are removed by the second filtering apparatus 24 before feeding to the casting equipment 16. it is to be noted in the present invention that the apparatus for removing part of the solvent of the prepared dope 11 is not restricted in the above described flash-evaporating apparatus 28, and for example, a thin film evaporator with rotating scraper, a multiple-effect evaporator and the like, which are already known, may be used. Further, the inline static mixer (not shown) may be provided between the second filtering apparatus 24 and the casting equipment 16. In this case, the characters of the prepared dope 11 can be varied adequately.

Note in the present invention that a filter paper is used as a filter of the first filtering apparatus 23, and a sintered metal filter is used as a filter in the second filtering apparatus 24. Further, the present invention does not depend on the above dope preparing equipment 15.

The prepared dope 11 after the filtration is fed as the casting dope 12 to the casting equipment 16. The casting dope 12 fed to the casting equipment 16 is cast to form a gel-like film 35 (see, FIG. 2) on a belt 31 as a substrate moved on a loop path by a rotating apparatus (not shown). The belt 31 is supported by at least first and second drums 32, 33, whose rotation continuously moves the belt 31 on the loop path. A solvent gradually evaporates from the gel-like film 35 on the belt 31, such that the gel-like film 35 may have a self-supporting property. Then, the gel-like film 35 is peeled as a film 36 from the belt 31 by the peeling roller 37. A free roller or a drive roller may be used as the peeling roller 37. When the peeling roller 37 is the drive roller, it is preferable to drive the peeling roller 37 in regulation of at least one of a drawing ratio, a tension and a slack of the film 36. Note that the peeling roller 37 has two functions for both peeling and guiding the film 36 in the above embodiment. In the present invention, however, the peeling roller for peeling the film 36 and a guide roller for guiding the film 36 to the drying equipment 17 may be separately provided.

The drying equipment 17 is constructed of a tenter apparatus 41 and a roller drying apparatus 42. In the tenter apparatus 41, both side areas of the film 36 are held by grips (not shown) and so on to apply a tension to the film 36 for drying the film 36. Thereafter the film 36 is further dried in the roller drying apparatus 42 including many rollers. After the drying, the film 36 is cooled in a cooling apparatus (not shown) provided in downstream from the drying equipment 17, and thus the temperature of the film 36 lowers to the room temperature.

Preferably, the both side areas of the dried film 36 are cut off by a cutter 46 such that the film may have a width of a product. Thereafter, the film 36 is wound by a winding apparatus 47. In the present invention, rollers 48 may be provided between the above apparatuses and equipments, and the number of the rollers 48 is not restricted. Note that the present invention does not depend on the structure of the drying equipment 17, the winding equipment 18, and the methods of drying and winding. And the film may be dried and wound in several drying methods and winding methods which are already known.

In reference to FIG. 2, a solution casting method will be explained as the method of the producing the polymer film from the polymer solution of the present invention. The casting equipment 16 includes the casting die 14, the first and second back-up rollers 32, 33, the belt 31, the peeling roller 37, a heating plate 51, plural condensers 52, plural liquid receivers 53, a recovery tank 56, and feed pipes. However, the present invention is not restricted in the casting equipment 16. Note that in this embodiment three sorts of the casting dopes 12 are prepared, and the casting thereof is made simultaneously to form the gel-like film 35 having three layer structure. Accordingly, as shown in FIG. 3, the gel-like film 35 has a first layer 35a, a second layer 35b and a third layer 35c sequentially from a side of the belt 31. The heating plate 51 and the condenser 52 are respectively connected to temperature controllers 51a, 52a.

Closed to a rear surface of the belt 31, on which the gel-like film 35 is not formed, the heating plate 51 is disposed as a heating means for heating the belt 31. Further, plural condensers 52 are provided in the opposite side to the heating plate 51, so as to closely confront to the gel-like film 35 on the belt 31.

A surface of the heating plate 51 is formed of metal, and the temperature of thereof is controlled by the temperature controller 51a. The heating plate 51 controller heats the gel-like film 35 on the belt 31 to evaporate the solvent. Note that the material of surface of the heating plate 51 is not restricted in this embodiment, and may be for example ceramics. Parts of the heating plate can be independently controlled by the temperature controller. The temperature control range is predetermined to at least the room temperature and at most the heat-resistant temperature of polymer or the highest boiling point of the used solvents. In this case, the heating plate 51 is enough effective. Further, the heating temperature is determined according to the sorts of the casting dope 12. The determination is adequately made in consideration of boiling points of the solvents, evaporation speed, compatibility of the solvent and the solid materials, heat-resistance and thermal dependence of polymers and other solid materials which are contained in the casting dope.

The heating plate 51 almost uniformly heats the confronting belt 31, and supplies an almost thermal energy uniformly for over all of the gel-like film 35 on the belt 31. The uniform heating is made by controlling the evaporation speed of the solvent at each parts of gel-like film 35. Accordingly, the shape of the heating plate 51 is not restricted so far as the temperature is controlled as described above. Therefore, the one heating plate 51 may be provided as shown in FIG. 2, and otherwise plural heating plates whose temperatures are individually controlled may be provided and arranged so as to confront the same area of the gel-like film 35. Further, the heating plate 51 is disposed almost parallel to the belt 31 which is moved almost straightly.

Further, it is preferable that the temperature of the belt 31 supported by the first and second back-up rollers 32, 33 can be adjustable. The first and second back-up rollers 32, 33 are preferably provided with a temperature controller (not shown) for heating the belt 31. Especially preferably, the temperature controller is provided for the first back-up roller 32, which is disposed in a casting side. In this case, the belt 31 is heated not only between the first and second back-up rollers 32, 33, but also on the first and second back-up rollers 32, 33. Therefore the evaporation speed of the solvent in the gel-like film 35 can be adequately controlled.

Further, the condensers 52 are provided just downstream from the casting position PS and just upstream from the peeling roller 37. The condensers 52 are disposed with intervals between the neighboring ones near the front side of the belt 31, on which the gel-like film 35 is formed. Further, there are liquid receivers 53 below the interval between the neighboring condensers 52. In this embodiment, each condenser 52 has a plate-like shape. The surface of the condenser 52 is made of metal, and the temperature thereof is controlled by the temperature controller 52a for cooling and condensing the solvent vapor generated from the gel-like film 35. Accordingly, so far as the temperature is controlled in the range of the lowest boiling point of the used solvents to the highest freezing point of the used solvent, the condensers 52 condenses the solvent vapor effectively. When the cooling temperature is lower than the freezing points of the solvents, the solvents freeze on surfaces of the condensers 52. In this case, the recovery of the solvents becomes difficult, or it is necessary to use a dissolving means for recovery. Note that the materials of the condensers 52 preferably have high heat conductivity, and are not restricted in this embodiment.

The cooling temperature of the condenser 52 is adequately determined depending on the sort of the solvents, and in consideration of the boiling points, condensing speeds and freezing points of the solvents. The solvent to which the solvent vapor is condensed and liquidized to flow downwards on a inclined surface which is formed from an inner side (a side of the gel-like film 35) to an outer side (a side opposite to the inner side). Then the solvent is received for recovery by the liquid receivers 53. In the present invention, the inclination between the inner side and the outer side may have a structure that the liquid flows downwards in effect of gravity for easy recovery, and the angles of inclinations are not restricted. The inner surface of each condenser 52 is parallel to a widthwise direction of the belt 31, and therefore almost parallel to the gel-like film 35. Note that in the gel-like film 35 a surface which is not contacted to the belt 35 is named a casting surface.

Closed to the casting surface, the moving of the belt 31 causes an unexpected flow of gas or air. In the present invention, it is preferable that the unexpected flow of air between the casting surface and the condensers 52 is as small as possible, and concretely at least 0.01 m/second and 0.5 m/second.

As the temperature of the gel-like film 35 is increased through the belt 31 heated by the heating plate 51, there is a temperature gradient Q between the casting surface and the condenser 52. When Ts (° C.) is the temperature of the gel-like film 35 formed on the belt 31, Tc (° C.) is a surface temperature of the condenser 52, and d (mm) is a distance between the casting surface and the condenser 52, the temperature gradient Q is defined as follows: $Q=(Ts-Tc)/d$. The temperature gradient Q preferably satisfies the range: $5<Q<100$. When the temperature gradient Q is in this range, the fluctuation of thickness of the gel-like film 35 is reduced, so as to obtain the film which is excellent in the uniformity of thickness. Note that the surface temperature Tc of the condenser 52 may be at least the temperature of the inner surface or a confronting surface to the gel-like film 35.

The concentration of the solvent vapor is higher near and lower apart from the casting surface. Since there is a gas, thermal diffusion occurs in a system with the temperature gradient. Therefore, the molecules of higher molecular weight in the gas moves to a side of lower temperature, and the molecules of lower molecular weight in the gas moves to a side of higher temperature. The phenomena are utilized especially for separating the mixture gas. When organic solvents are used as the solvents, there are molecules of air (including nitrogen molecules, oxygen molecules, carbon dioxide and the like), molecules of evaporated organic solvents in the space of temperature gradient between the casting surface and the condenser. Almost of the molecules of the organic solvents used for producing the film for optical use have a larger molecular weight than molecules of air. Therefore the thermal diffusion occurs such that the molecules of the solvent may move to the condenser. Thus the saturation of the molecules of the solvent near the casting surface is prevented to progress the evaporation of the solvent from the gel-like film 35.

When the temperature gradient Q is at least 100, a difference between the heating temperature of the heating plate 51 and the cooling temperature of the condenser 52 is too large, and drops of the condensed solvent generate in gas phase to form dews thereof to the casting surface. Further, the temperature gradient is at most 5, the evaporation of the heated solvent and the condensation of the cooled solvent are made in lower speed, and the effects thereof is not enough.

Further, in circumstance of nonuniform temperature in the area between the heating plate 51 and the condenser 52, the thermal energy is transported by the moving molecules in the area. Accordingly, while the heating plate 51 confronts to the belt 31 with a large confronting area, the thermal energy is continuously and uniformly supplied for the belt 31 so as to compensate for the thermal energy discharged outside. Thereby it is preferable that a fluctuation of the temperature gradient Q is at most 10% of the temperature gradient Q, and the control of the temperature gradient Q is made by adjusting the temperature Ts (° C.) of the gel-like film and the surface temperature Tc (° C.) of the condenser 52.

The variation value is more than 10% of the temperature gradient Q, the evaporation of the solvent from the polymer solution cast on the belt 31 cannot be uniformly made. In this case, the thickness and mechanical properties of the produced film, or the optical properties (retardation and the like) in a thickness direction and a surficial direction (or an any direction in a surface) have fluctuation, which are not preferable. Further, the temperature gradient Q is preferably at most 8%, and especially at most 5%.

The surface temperature Tc of the condenser 52 is preferably adjusted in an area confronting to the casting surface, such that the variation value of temperature may be at most 10° C. When the variation value is more than 10° C., the uniform condensation of the solvent valor becomes difficult, and therefore the thermal diffusion is made with non-uniformity. Thus the evaporation speed of the solvent from the gel-like film 35 is made nonuniformly. The variation value of the surface temperature Tc is preferably at most 8° C., and especially 5° C.

It is preferably in the present invention that a variation value of the distance d between the casting surface and the condenser 52 is at most 10% of an averaged value dA of the distance d. In this case, the temperatures described above and differences thereof can be kept, and as a result, the fluctuation of the thickness of the obtained film 36 becomes smaller. In order to control the distance d between the casting surface and the condenser 52, uniform properties or characteristics of the casting dope 12, the uniform casting speed and the smoothness of the surface of the condenser 52 are necessary.

Usually, in the solution casting method the belt 31 is moved such that the casting dope cast on the belt 31 may be transported upwards or horizontally as the gel-like film 35 from the casting position PS above the first back-up roller 32. Thus the drip ping of the casting dope from the gel-like film 35 in initial state after the casting, in which the content of the solvent is high, is prevented.

However, it is especially preferable in the present invention that the first and second back-up rollers 32, 33 rotate to transport downward the casting dope from the casting position PS above the first back-up roller 32. Accordingly, the casting position PS is disposed above the area in which the back-up roller 32 is lapped by the belt 31. Note that the casting dope 12 form a curve from the casting die to the belt, and it is preferable that a tangential line on the curve at the casting position PS is the same as a tangential line on the belt 31 at the casting position PS, or as same as possible.

In the present invention, the heating plate 51 and the condensers 52 are provided, and the casting position PS and the casting direction are determined, as described above. Therefore, even though the casting dope 12 just after being cast is transported downward as the gel-like film 35, the drop ping of the casting dope is prevented, and the evaporated solvent generated just after the casting is recovered with high yield.

The present invention does not depend on the thickness of the obtained film 36. However, the thickness T of the gel-like film 35 just after the casting is preferably from 10 μm to 1000 μm, as the present invention is effective in this case. The thickness T is especially preferably from 20 μm to 500 μm, as the effect of the present invention becomes larger. Note that the gel-like film 35 just after the casting the casting dope means part of the gel-like film 35 from the casting position PS to the first one of the condensers 52. In this embodiment, the gel-like film 35 has a multi-layer structure, and the thickness T is the total thickness of the layers which are simultaneously formed in one casting process.

The moving speed of the belt 31 is preferably from 5 m/minute to 200 m/minute. Note that the moving speed and the casting speed are the same. When the thickness T is less than 10 μm, the amount of the solvent in the polymer solution in a unit area is small, and therefore the evaporation speed cannot be controlled enough. Further, when the thickness T is larger than 1000 μm, the solvent near the belt 31 is heated in the gel-like film 35. However, as the thermal energy is hardly transmitted to a side of the casting surface, the evaporation of the solvent is hardly performed. Further the solvent of the gel-like film 35 or the gas of the solvent sometimes remain in the inner part of the film 36. Accordingly, the surface condition becomes bad. Further, the drying speed is inversely proportional to a square value of the thickness. Therefore, when the thickness is too large, the productivity becomes lower, which is not preferable.

The present invention is also effective when the gel-like film 35 and the film 36 have a single layer structure. However, the present invention is especially effective when they have multi-layer structure. The casting method may be the co-casting and the sequential casting.

Figure 2:
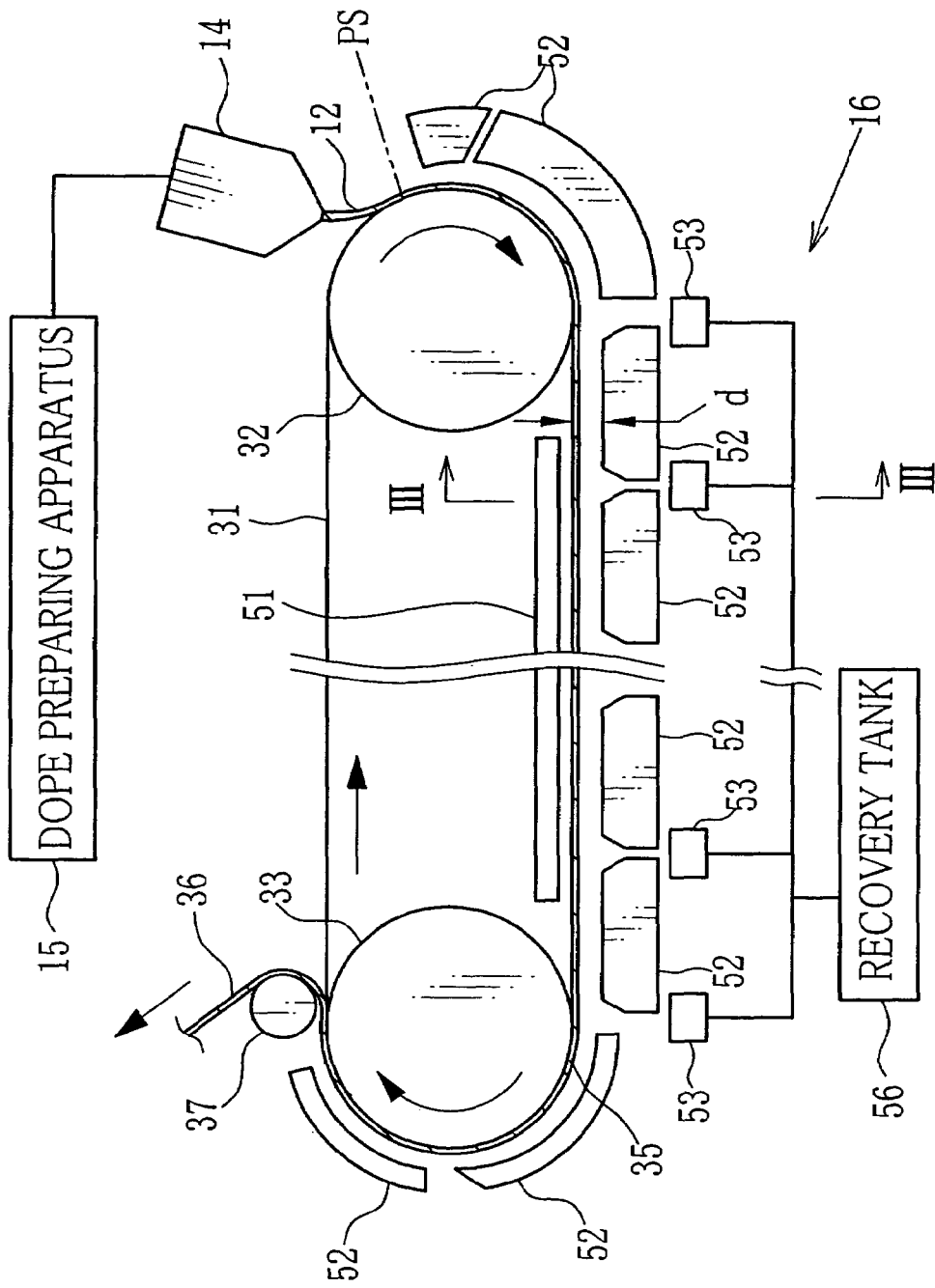
FIG. 2 is a schematic diagram of a first embodiment of a casting equipment of the present invention.
Figure 3:
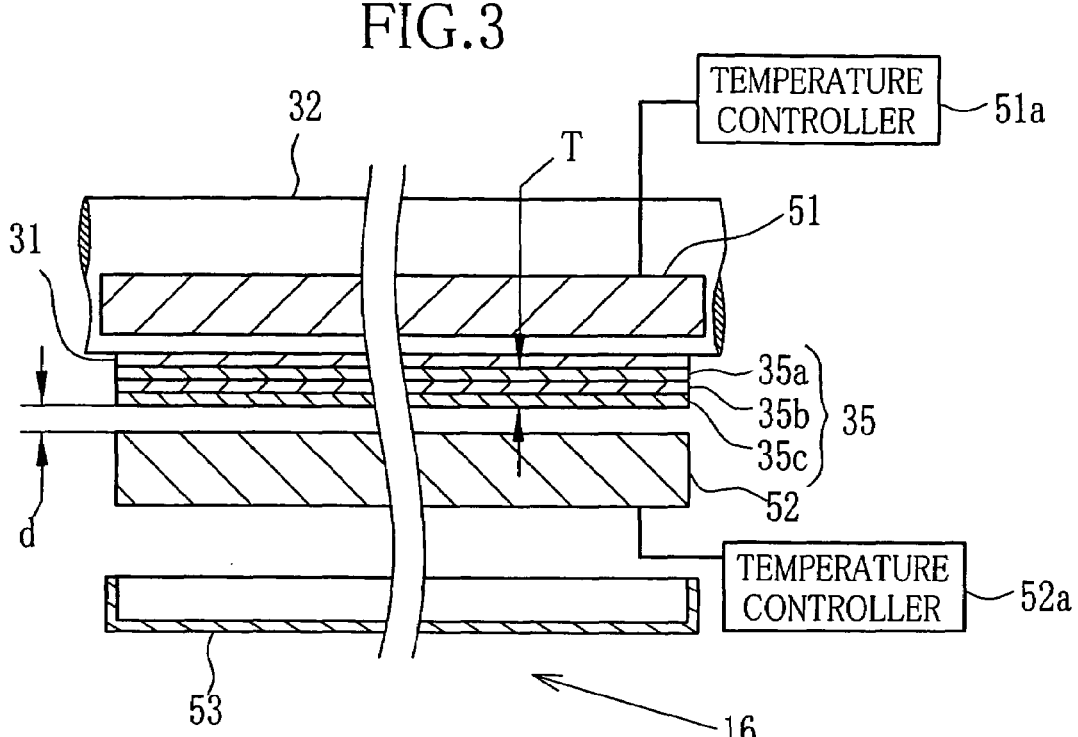
FIG. 3 is a sectional view along a III-III line of FIG. 2.
Figure 4:
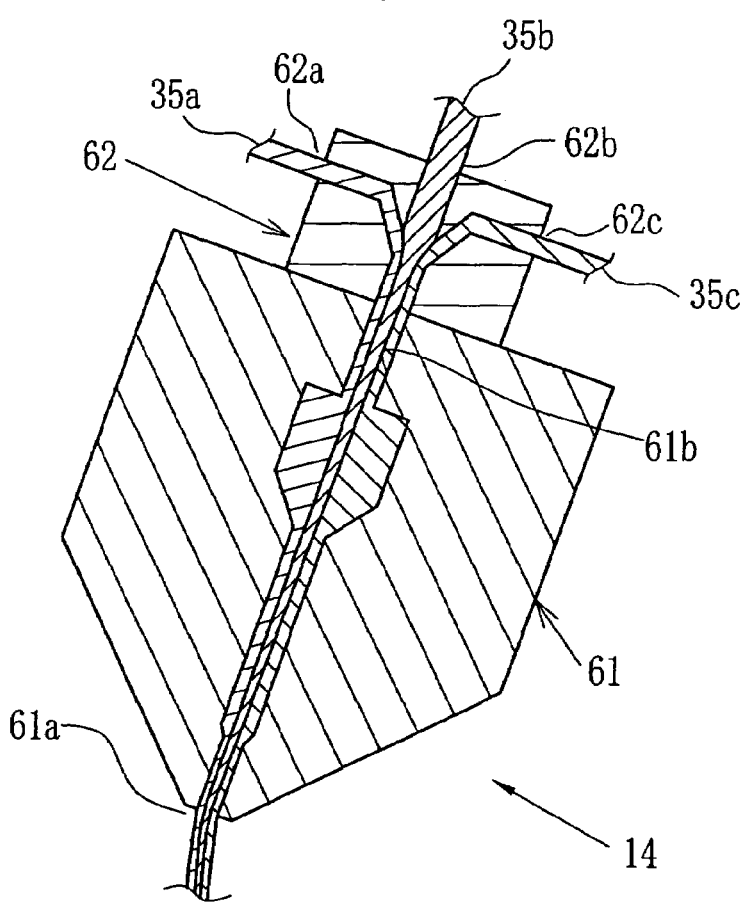
FIG. 4 is a sectional view of a casting die of the present invention.

An explanation of a casting process is made in reference with FIG. 4, and the same devices and members as in FIGS. 1-3 are provided with the same numbers, and the explanations therefor are omitted. As shown in FIG. 4, the casting die 14 is a feed-block type one.

The casting die 14 is constructed of a die-block 61 and a feed-block 62, and usually called a coat hanger type one. The feed-block 62 is disposed on a back (or opposite face to a die lip 61a for discharging the casting dope 12) of the die-block 61. The feed block 62 has inlets 62a-62c, and the casting dopes 12 includes casting dopes 12a-12c for forming respective first to third layers of the gel-like film 35. The casting dopes 12a-12c are respectively supplied through the inlets 62a-62c. In the feed-block 62, passages extending from the inlets 62a-62c are joined to one passage such that the three casting dopes 12a-12c may construct a three-layer structure, and thereafter may be supplied into the die-block 61. The die-bock 61 has a single passage 61b. The casting dope 12 having the three-layer structure flows in the passage 61b, and discharged from the die lip 61a. This casting is called the co-casting.

Further, in the present invention, the feeding pressures to be respectively applied to the casting dopes 12a-12c for feeding through the passages can be independently controlled. Therefore the thickness of each first to third layer 35a-35c is regulated. In order to control the thickness of each first-third layer 35a-35c the thickness of passage as flow paths of the three casting dopes 12a-12c is adequately determined near the portion where the three passages are joined, and otherwise, the feeding pressures to be respectively applied to the casting dopes 12a-12c are adequately adjusted.

Figure 5:
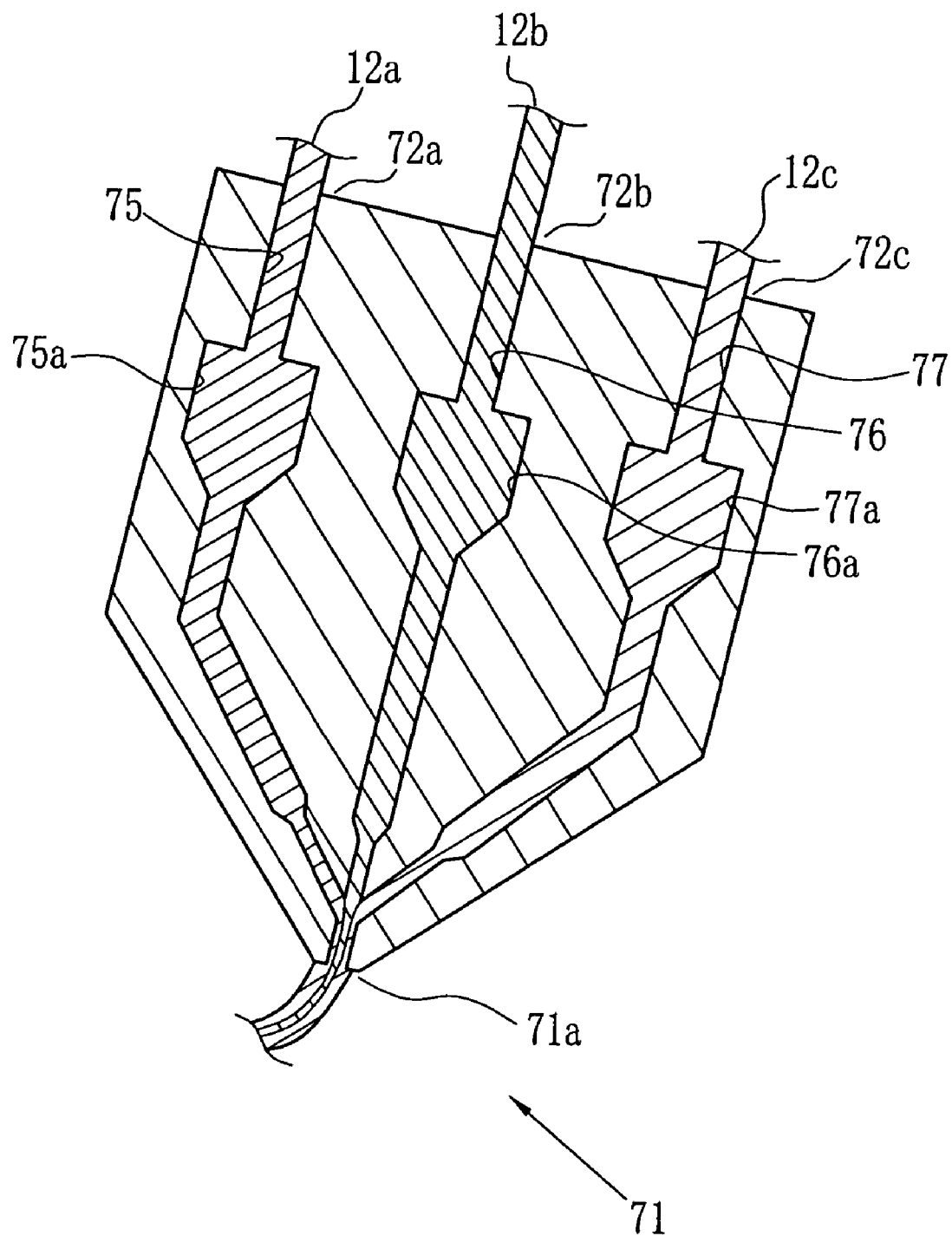
FIG. 5 is a sectional view of another embodiment of a casting die of the present invention.

As shown in FIG. 5, a casting die 71 is a multi-manifold type one, and can simultaneously form three layers the same as the casting die 14 in FIG. 4. The same devices and members as in FIGS. 1-4 are provided with the same numbers, and the explanations therefor are omitted. Three casting dopes 12a-12c are supplied through respective flow paths (not shown) to the casting die 71. On a back face of the casting die 71 are formed inlets 72a-72c for supplying the casting dopes 12a-12c into the casting die 71. The casting dopes 12a-12c temporary pools in respective pockets 75a, 76a, 77a which are formed on the passages 75-77. Thereafter the casting dopes 12a-12c are joined near a die lip 71 to construct the three layer structure, and discharged simultaneously in this situation.

In the casting die 71, it is to be noted that positions of the inlets 72a-72c of the casting dopes 12a-12c, shapes of passages 75-77, shapes of the pockets 75a-77a, and the structure of a portion where the passages are joined near the die lip 71a are not restricted, and the casting die 71 may be the usual casting die of the multi-manifold type for performing the co-casting. In the present invention may be further used the casting die of the multi-manifold type that can simultaneously form N layers (N is a natural number at least 2). In this case, the number of the flow paths is N, and the substantial structure is the same as the above embodiment.

Further, in the present invention, the feed-block type in FIG. 4 and the multi-manifold type in FIG. 5 may be combined to perform the co-casting. In this case, the band (see, FIGS. 2-4) or the drum (see, FIG. 5) may be used as the substrate.

Figure 6:
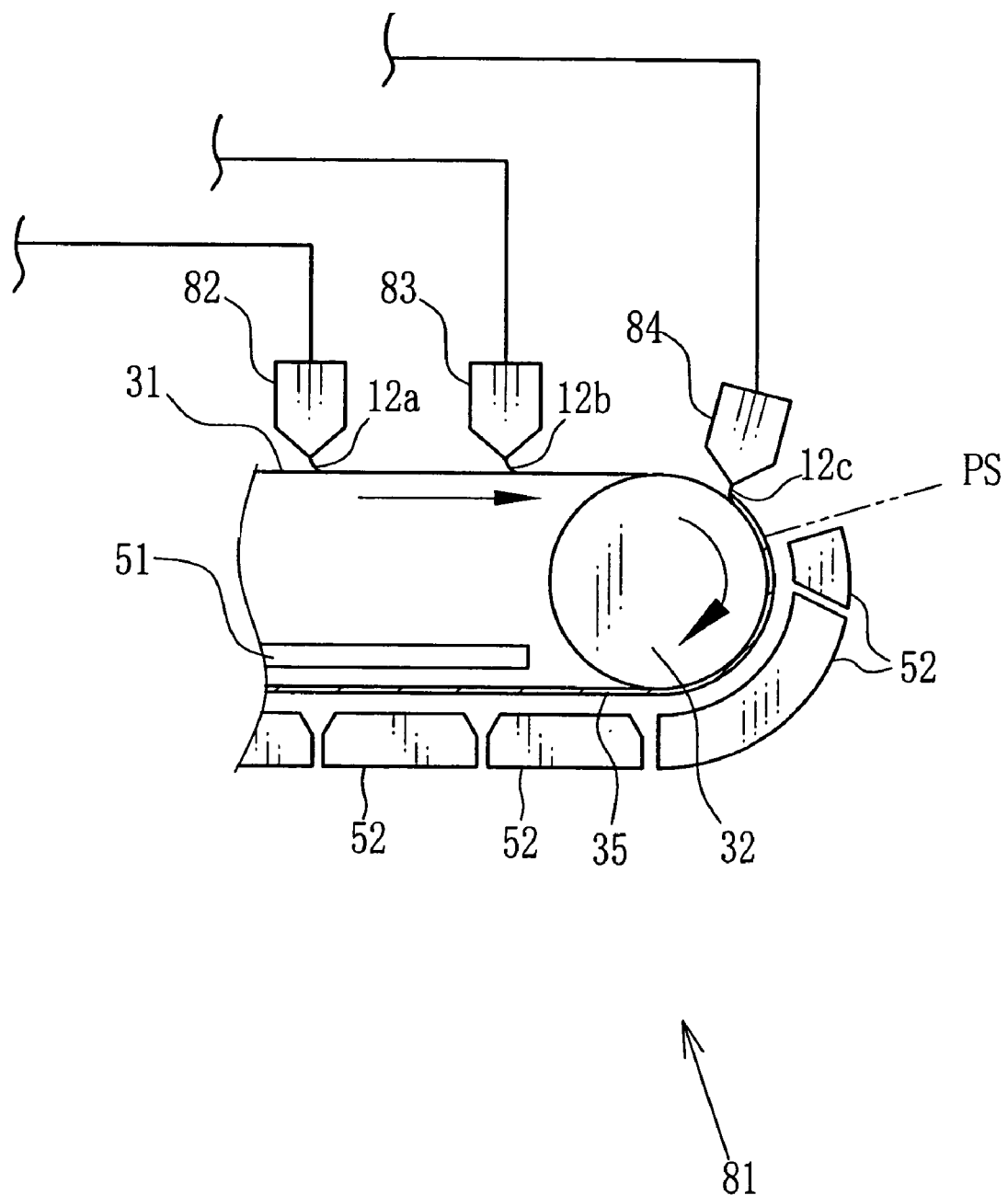
FIG. 6 is a plan view of second embodiment of a casting equipment.

In the present invention, a casting equipment 81 may be used as shown in FIG. 6 for the casting, such that the sequentiqal casting may be performed instead of the co-casting. The same devices and members as in FIGS. 1-4 are provided with the same numbers, and the explanations therefor are omitted. In the casting equipment 81, three casting dies 82-84 are disposed above the belt 31, onto which the casting dopes 12a-12c are sequentially cast from the respective casting dies 82-84 to form the gel-like film 35 having the three layer structure.

Note that the heating plate 51 and the condensers 52 are disposed to have the same positional relation to the casting die 84 which is provided at the same position of the casting die 14 in FIG. 2. The positions of the liquid receivers and the recovery tanks are the same, and are omitted in this figure.

When it is designated to make the sequential casting, the number of the casting dies to be used is not restricted in three, and may be equal to or less than the number of the layers to be formed. For example, it is designated to form the N layers in performing the sequential casting NC times (NC is natural number at least 2), the following formula is satisfied: $2 \leq NC \leq N$ (N is natural number at least 2). In the condition of NC<N, the co-casting is made at least once in the casting process.

In the above method of the present invention, the uniformity of thickness of the produced film becomes larger, and the excellent optical polymer film can be obtained. The optical properties often depend on fluctuation of thickness of the polymer film, and this tendency is especially extreme when the main component of the film is aromatic polymers and other polymers which have cyclic structure. And the polymer film of the present invention that can be produce by the above method and apparatus is excellent in uniformity of thickness, birefringence, permeableness and the like. Accordingly, the polymer film is adequately used in the polarizing filter and a liquid crystal display. In followings, the explanation for the polymer film is made in detail.

Figure 7:
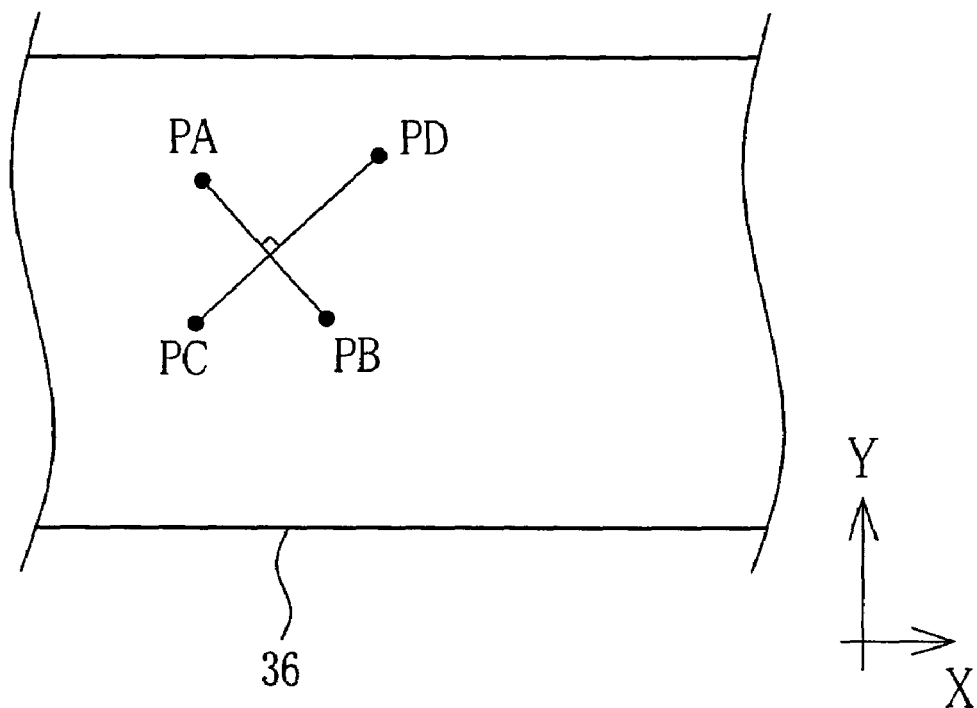
FIG. 7 is a plan view illustrating a measuring position of a film thickness and a measuring position of birefringence.

In FIG. 7, an X-axis extends in the lengthwise direction and a Y-axis extends in the widthwise direction, or a perpendicular direction to the lengthwise direction of the film 36. In order to regulate the thickness, values thereof (hereinafter thickness value) of the film 36 are measured at several points on a line segment L1 between optional two points PA, PB in the XY-plane on the film 36. The length of the line segment L1 is preferably larger. Further, since the change of surface conditions and the fluctuation of the thickness are usually cyclical in the film, the length of the line segment L1 is preferably at least that corresponding to one cycle variation or fluctuation. The measurement of the thickness of the film 36 is made with use of a meter which can measure in order of μm.

Figure 8:
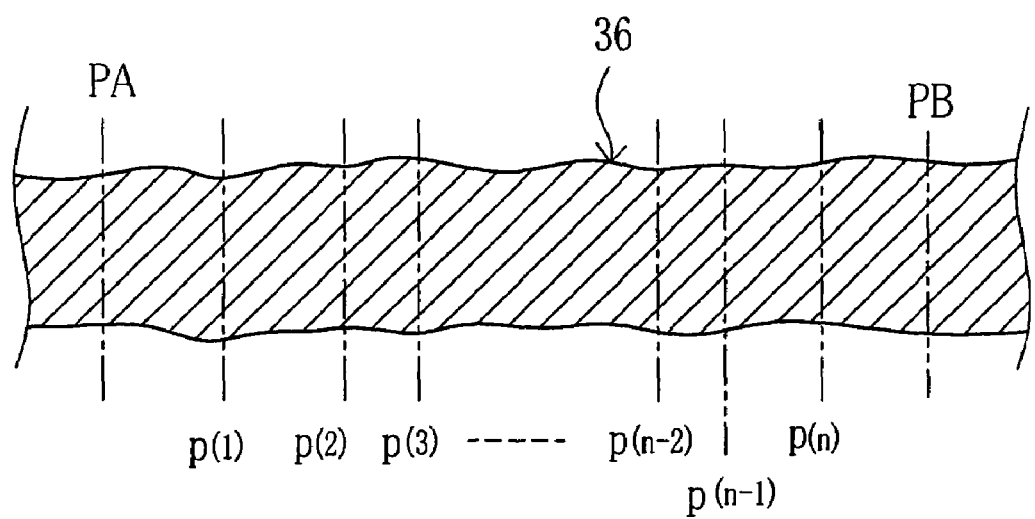
FIG. 8 is a sectional view illustrating a measuring position of a film thickness and a measuring position of birefringence.

Concretely, in FIG. 8, n positions from p(1) to p(n) are optionally selected between the P1 and P2 (n is optional and natural number), and the measurement of the thickness is made with a thickness meter at the n measuring positions p(1), p(2), p(3), ..., p(n−2), p(n−1), p(n). Thus a continuously running measurement is made to acquire a thickness data which includes thickness values of t(1), t(2), t(3), ..., t(n−2), t(n−1), t(n) and the fluctuation and change of the thickness between the measuring positions p(1), p(2), p(3), ..., p(n−2), p(n−1), p(n), and the like. Then a first thickness average TA1 is calculated as an averaged value of these thickness values t(1), t(2), t(3), ..., t(n−2), t(n−1), t(n). Further, the respective thickness deviations of the thickness values at the measuring positions p(1), p(2), p(3), . . . , p(n−2), p(n−1), p(n) are calculated, to obtain a mean deviation of the thickness deviations as a first mean deviation MD1. In the present invention, the first mean deviation MD1 preferably satisfies the condition of MD1≦0.1×TA1, and especially MD1≦0.08×TA1. Note that the deviation means a sample standard deviation in the present invention.

Further, frequency spectrum data of the obtained thickness data is acquired by a FFT program with an operator in the thickness gauge. In the frequency spectrum data, wavelength is transformed from a running distance in the continuously running measurement of the thickness, and is a variable (or a parameter). The Fourier Transformation is defined by a transformation formula in which Fourier components are used to make a transformation between the time and the frequency. The Fourier Transformation is applied to DFT (Discrete Fourier Transformation), and in FFT the operating time becomes extremely shorter than the DFT. The data processing is usually made in measurement of thickness, the moving distance transformed to the corresponding wavelength is also shown as corresponding time. And several sorts of thickness gauge having function of such data processing are sold in the market. Note that Thickness Tester KG601A (produced by Anritsu Corp.) is sold in the market and used as the thickness meter of contacting type in the present invention.

In the present invention, the maximum of the frequency spectrum is preferably at most 10% of the first thickness average TA1. Further, in this case, when the transformation of the frequency spectrum data is made to obtain spatial frequencies, the wavelength range in the obtained special frequencies is preferably at most 20 cm.

Further, as shown in FIG. 7, the thickness is measured also at optional points on the line segment L2 between the points P3 and P4 in a similar manner to the measurement of thickness on the line segment L1. The second thickness average TA2 of the obtained thickness values is calculated. Then the thickness deviations (standard deviation of thickness) of the line segment L2 is calculated from the thickness values, and a mean deviation thereof is obtained as a second mean deviation MD2. The second mean deviation MD2 preferably satisfies the condition of MD2≦0.1×TA2, and especially MD2≦0.08×TA2.

Further, frequency spectrum data is obtained from the thickness data as described above. In the present invention, the maximum of the frequency spectrum is preferably at most 10%, and especially at most 8% of the second thickness average TA2. Further, in this case, when the transformation of the frequency spectrum data is made to obtain spatial frequencies, and the wavelength range in the spatial frequencies is preferably at most 20 cm.

In the following explanations, the perpendicular positional relation of two line segment means that an extension of the two line segment perpendicularly cross in one plane even though the two line segment does not cross in actual.

According to the thickness values measured in one direction on the film 36, the mean deviations of the thickness values and the intensities of the frequency spectrum obtained by the FFT analysis of the thickness data are in the above range as described above. Thus the polymer film having the adequate thickness for optical use is obtained. Further, these values are obtained in perpendicular two directions, and controlled in the above range. Accordingly, the polymer film is excellent in properties of the thickness. Note when the thickness is measured in the lengthwise direction of the film 36, the thickness value is preferably obtained in middle portion in the widthwise direction, and when the thickness is measured in the widthwise direction of the film 36, the measurement is preferably made in several positions arranged in the lengthwise direction.

By the way, the birefringence is induced when a light travels through a material in which there is a difference in the refractive indices. In such material, the incoming light splits into two lights whose polarization is at 90 degree to each other and whose velocities of the traveling light through the material is different. The difference of the velocities causes the phase difference. Usually, when the velocity of the traveling light through a vacuum space is c and the transmitting velocity of light through a material is v, the refractive index n is represented in the formula: $n=c/v$. The birefringence is, as above described, a phenomenon caused by difference of two refractive indices in one material.

The two axes in which the light wave propagates are called principal axes. The light waves respectively propagate in planes parallel to the principal axes. The principal which include a fast axis and a slow axis. The one light wave propagating along the fast axis through the materials faster than the another light wave propagating along the slow axis, namely, the transmitting velocity of the former wave is faster than the latter wave. The largeness of the birefringence is detected and represented as the phase contrast between the waves traveling along slow and fast axes. The absolute value of birefringence cannot be represented by wavelength corresponding to 360° phase contrast. Therefore, the detected phase contrast is standarized with the wavelength so as to transform to the unit of length (nm).

A birefringence meter detects the principal axis of a sample of the measured material, and measures the phase contrast Δnd. The phase contrast Δnd is defined by the following formula, when the thickness of the sample d, the refractive index of the light wave propagating in plane parallel to an incident angle is ne, and the refractive index of the light wave propagating in plane perpendicular to the incident angle is no: $\Delta nd = d(ne-no)$. Accordingly, the phase contrast, or the birefringence depends on the thickness of the material. In the present invention, as the thickness of the produced polymer film is uniform, the double refraction is excellent.

In the birefringence, there are two values of the phase contrasts which are known as a retardation Re in an in-plane direction (or optional direction in a surface) of the film 36 and a retardation Rth in a thickness direction of the film 36. In the present invention are obtained first retardations Re at several points which are arranged in the in-plane direction or on an optional line segment in XY-plane in FIG. 7. Then a mean deviation of the first retardations Re1 is calculated as a third mean deviation MD3. When the averaged value of the first retardations Re is a first retardation average RA1, the third mean deviation MD3 satisfies the condition: $MD3 \leq 0.10 \times RA1$.

Further, the transformation of the frequency spectra data of the first retardations Re is made to obtain spatial frequencies data. In this case, it is preferable that the wavelength range in the spatial frequencies is at most 20 cm, and the maximum of the frequency spectrum of the first retardations Re is at most 10% of first retardation average RA1.

Further, in the same manner as the data analysis of thickness, the frequency spectrum data of second retardations Re is obtained also in the measurement at the same several points in a perpendicular direction to the above optional line segment. In the present invention is calculated as a fourth mean MD4 deviation the mean deviation of the second retardations Re measured in the perpendicular direction. When the averaged value of the second retardations Re is a retardation average RA2, the fourth mean deviation MD4 satisfies the condition: $MD4 \leq 0.10 \times RA2$. Further, the transformation of the frequency spectrum data of the second retardations Re is made to obtain spatial frequencies. In this case, it is preferable that the wavelength range in the spatial frequencies is at most 20 cm, and the maximum of the frequency spectrum of the second retardations Re is at most 10% of the second retardation average RA2.

In this embodiment, as described above, the mean deviation of the retardations Re measured in the optional direction, and the intensities of the frequency spectrum obtained in the FFT analysis of the retardations Re are regulated in the above ranges. Thus the produced polymer film can have thickness properties adequate for optical use. Further other retardations Re are measured in the perpendicular direction to the optional direction, and the frequency spectrum data obtained from the other retardations Re are also controlled in the above ranges. Thus the produced polymer film can have thickness properties more adequate for optical use.

Further, the frequency spectrum data of third retardations Rth are obtained also at several points in the thickness direction. In the present invention the mean deviation of the retardations Rth is calculated as a fifth mean deviation. When the averaged value of the retardations Rth is a third retardation average RA3, the fifth mean deviation MD5 satisfies the condition: $MD5 \leq 0.10 \times RA3$.

Further, the transformation of the frequency spectrum data of the third retardations Rth is made to obtain spatial frequencies. In this case, it is preferable that the wavelength range in the spatial frequencies is at most 20 cm, and the maximum of the frequency spectrum of the third retardations Rth is at most 10% of the third retardation average RA3.

As the thickness value, the frequency spectrum data of fourth retardations Rth are obtained also at the same several points arranged in the perpendicular direction to the above thickness direction. In the present invention is calculated as a sixth mean deviation the mean deviation of the fourth retardations Rth. When the averaged value of the fourth retardations Rth is a fourth retardation average RA4, the sixth mean deviation MD6 satisfies the condition: $MD6 \leq 0.10 \times RA4$. Further, the transformation of the frequency spectrum data of the fourth retardations Rth is made to obtain spatial frequencies. In this case, it is preferable that the wavelength range in the spatial frequencies is at most 20 cm, and the maximum of the fourth retardations Rth of the frequency spectrum is at most 10% of the fourth retardation average RA4.

As described above, the mean deviation of the retardations Rth, a difference of the intensities of the frequency spectrum obtained in the FFT analysis of the retardations Rth are in the above range in one optional direction of the film 36. Thus the produced polymer film has adequate thickness fluctuation for the optical use. Further, the mean deviations and the distribution obtained in the perpendicular direction to the optional direction are in the above range. Thus the produced polymer film has thickness fluctuation adequate to the optical use. Note that it is preferable that the retardations Re in the in-plane direction and the retardations Rth in the thickness direction are measured at the same positions as the thickness values of the film is measured. Note that the respective mean deviations of the thickness values and retardations Re, Rth are obtained according to two directions in one swinging plane, namely, in one optional direction and a perpendicular direction thereto.

In the present invention, when the polymer film is 80 μm in thickness, the transmittance of the visible light through the polymer film is preferably at least 90%, and especially at least 93%. Further, at optional two positions on the XY-plane in FIG. 7, namely arranged in the in-plane direction, the difference of the transmittances in the thickness direction is preferably at most 5%, and especially at most 2%. Thus the produced polymer film has birefringence and the transmittance which are effective for the optical use. When the transmittance is less than 90%, the displayed image becomes dark and the coloring thereof occurs. Therefore in this case the polymer film is not adequate for the optical use and the use in the display and the like.

Further, when the relative humidity is 10%, the surface resistance of the polymer film is preferably in the range of $1 \times 10^{10} \Omega$ to $1 \times 10^{13} \Omega$, and particularly in the range of $1 \times 10^{10} \Omega$ to $1 \times 10^{11} \Omega$. The difference of the surface resistances at optional two points is preferably at most 20%, and especially at most 10% of the average value of the surface resistances at the two points. Further, it is not preferable that surface resistance of the polymer film is larger than $1 \times 10^{13} \Omega$. In this case, when the polymer film is stacked to other films in the liquid crystal display and the like, the insulation is so high that the electric charge in other layer cannot flow through the film. Further, it is not preferable to adsorb the dusts around the polymer film by static electricity. Otherwise, it is not preferable that the surface resistance of the polymer film is smaller than $1 \times 10^{10} \Omega$, since the polymer film doesn't have function of the insulating layer. In order to obtain the above optical properties and electric properties, the polymer film of the present invention is produced in the above solution casting method.

The present invention can be applied so far as polymers or prepolymers thereof are dissolved to the solvent to prepare the dope for producing the film. As the polymers or prepolymers, there are, for example, cellulose acylate, polycarbonate (PC), aramide resins, polyvinylalcohol, denatutrated polyvinylalcohol, polyacrylic acid esters, polymethacrylic acid esters, polyethylene telephthalate (PET), polybutylene telephthalate (PBT), chlorinated polyethers, polyacetal, polyether ether ketones (PEEK), polyether sulfone (PES), polyimide (PI), polyamides (PA), polyamide imide (PAI), polyphenyleneoxide (PPO), polyphenylene sulfone, poly sulfone, polyallylate, polycarbonate (PC), polyethylene (PC), polypropyrene (PP), polystylene (PS), polyvinyl chloride (PVC) and the like. One or combination of plurality of those may be used.

Especially in the present invention, it is preferable that the polymer contains at least one of cellulose acylate as shown chemical formulae 1-7, polycarbonate (PC), aramide resins, polysulfone and polystyrene. Note that n or m in chemical formulae 1-7 are natural numbers from 10 to 1000.

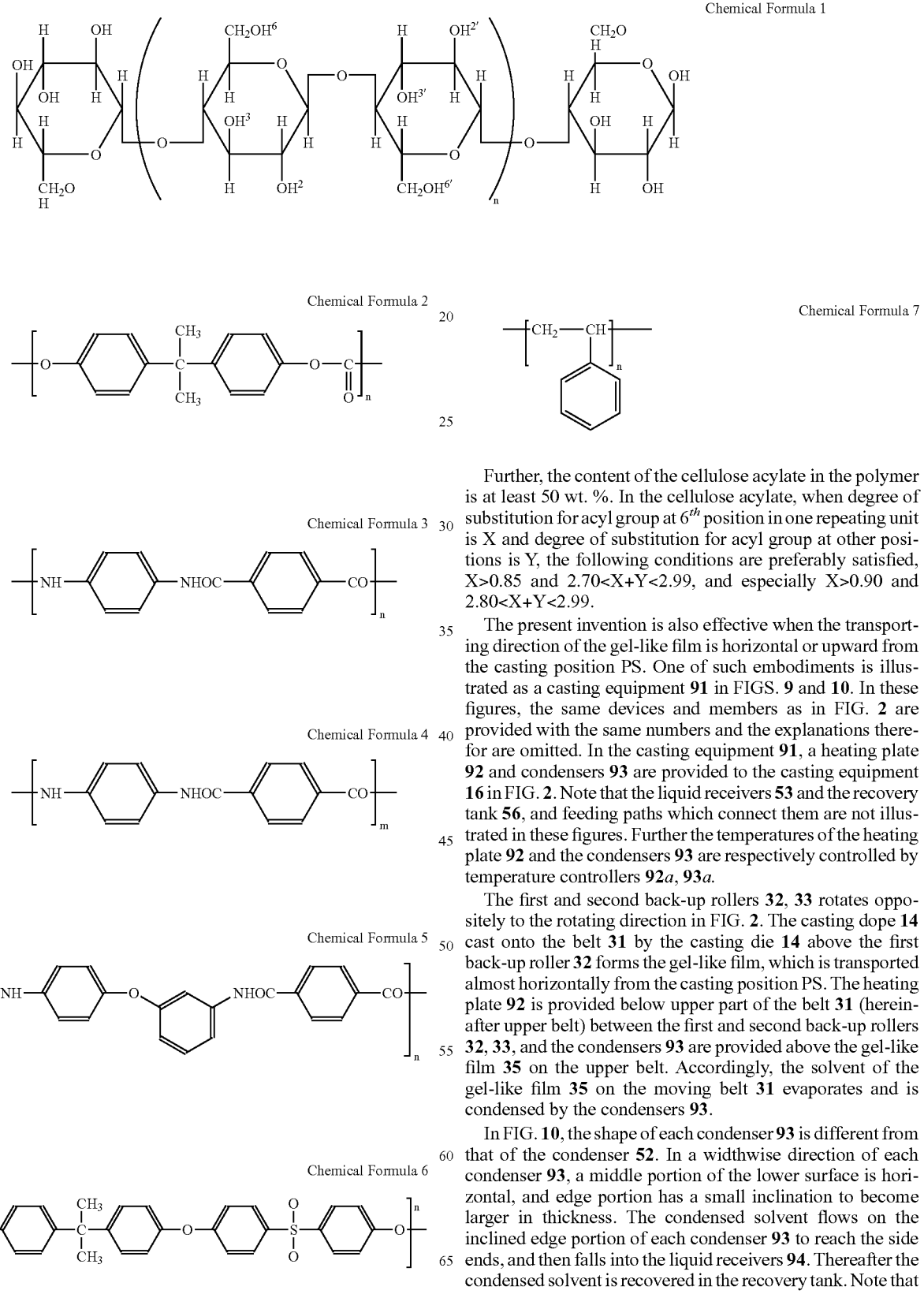

Further, the content of the cellulose acylate in the polymer is at least 50 wt. %. In the cellulose acylate, when degree of substitution for acyl group at $6^{th}$ position in one repeating unit is X and degree of substitution for acyl group at other positions is Y, the following conditions are preferably satisfied, $X>0.85$ and $2.70<X+Y<2.99$, and especially $X>0.90$ and $2.80<X+Y<2.99$.

Figure 9:
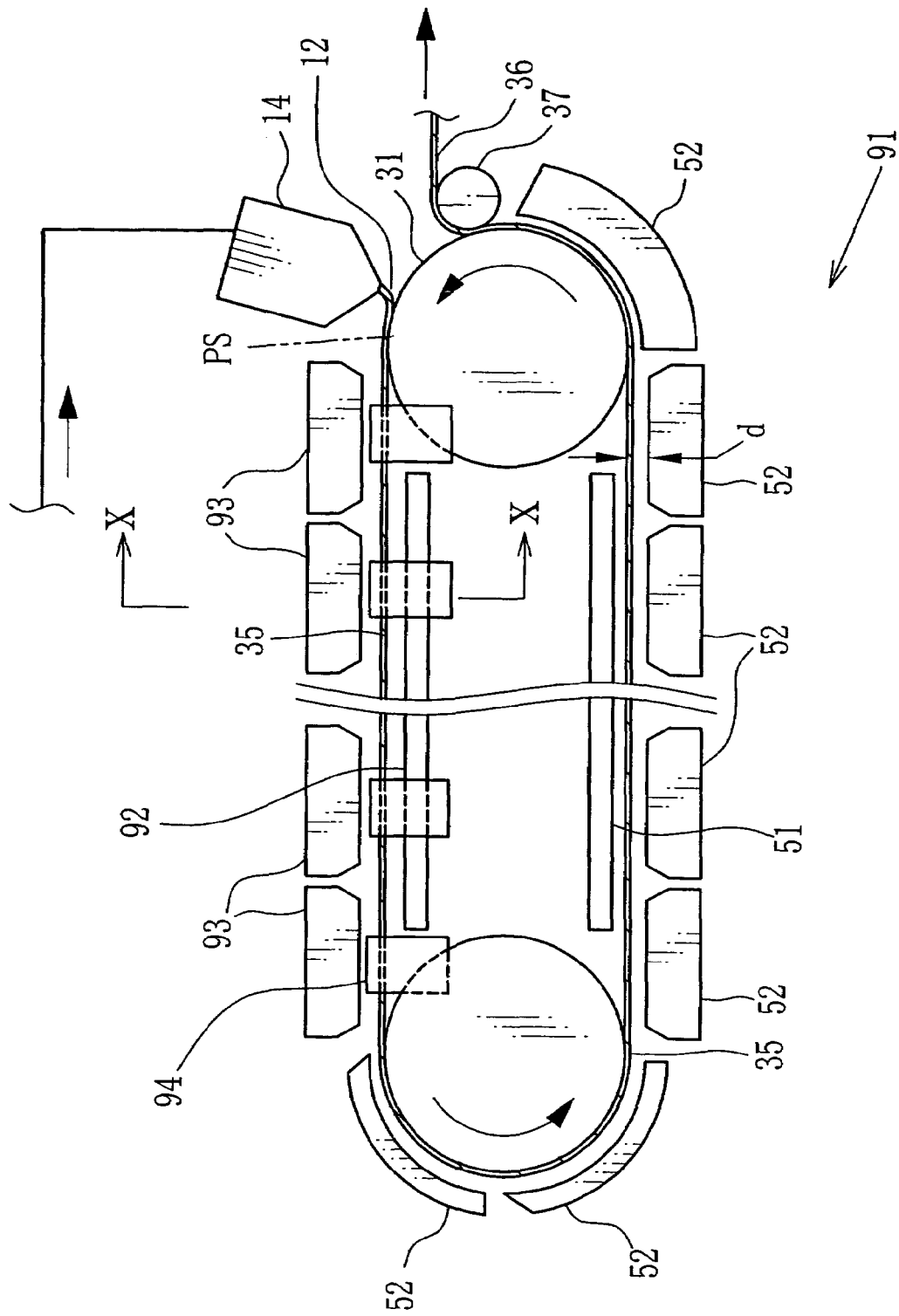
FIG. 9 is a partial plan view of a third embodiment of a casting equipment of the present invention.

The present invention is also effective when the transporting direction of the gel-like film is horizontal or upward from the casting position PS. One of such embodiments is illustrated as a casting equipment 91 in FIGS. 9 and 10. In these figures, the same devices and members as in FIG. 2 are provided with the same numbers and the explanations therefor are omitted. In the casting equipment 91, a heating plate 92 and condensers 93 are provided to the casting equipment 16 in FIG. 2. Note that the liquid receivers 53 and the recovery tank 56, and feeding paths which connect them are not illustrated in these figures. Further the temperatures of the heating plate 92 and the condensers 93 are respectively controlled by temperature controllers 92a, 93a.

The first and second back-up rollers 32, 33 rotates oppositely to the rotating direction in FIG. 2. The casting dope 14 cast onto the belt 31 by the casting die 14 above the first back-up roller 32 forms the gel-like film, which is transported almost horizontally from the casting position PS. The heating plate 92 is provided below upper part of the belt 31 (hereinafter upper belt) between the first and second back-up rollers 32, 33, and the condensers 93 are provided above the gel-like film 35 on the upper belt. Accordingly, the solvent of the gel-like film 35 on the moving belt 31 evaporates and is condensed by the condensers 93.

Figure 10:
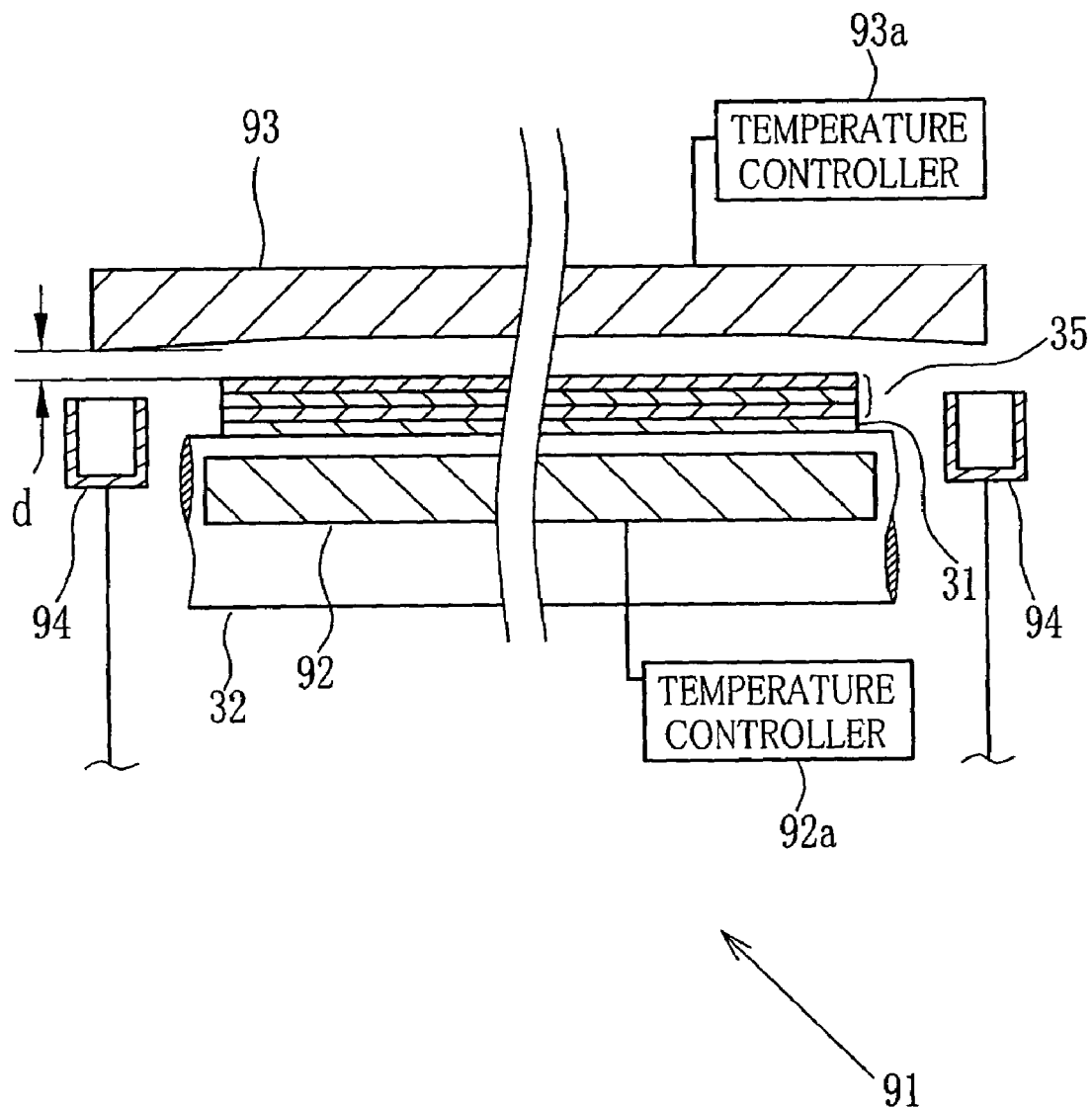
FIG. 10 a sectional view along a IX-IX line of FIG. 9.

In FIG. 10, the shape of each condenser 93 is different from that of the condenser 52. In a widthwise direction of each condenser 93, a middle portion of the lower surface is horizontal, and edge portion has a small inclination to become larger in thickness. The condensed solvent flows on the inclined edge portion of each condenser 93 to reach the side ends, and then falls into the liquid receivers 94. Thereafter the condensed solvent is recovered in the recovery tank. Note that the distance d between the gel-like film 35 and the condensers 93 is preferably in the range of 0.1 mm to 15 mm, especially in the range of 2 mm to 10 mm.

The gel-like film 35 is further transported on the second back-up roller 33 which is provided with a heating device (not shown). Then the gel-like film 35 on a lower part the moving belt 31 (hereinafter the lower belt) between the first and second back-up rollers 33, 32 is transported to the peeling roller 37, which peels the gel-like film 35 as the film 36 from the belt 31. While the gel-like film 35 is transported on the lower belt and on the first back-up plate 32, the solvent evaporates and condensed by the heating plate 52 and the condensers 52. Thus in this embodiment, independent of the transporting direction of the gel-like film 35, the solvent is uniformly evaporated and condensed from the casting position, and the solvent is recovered in high yield.

Figure 11:
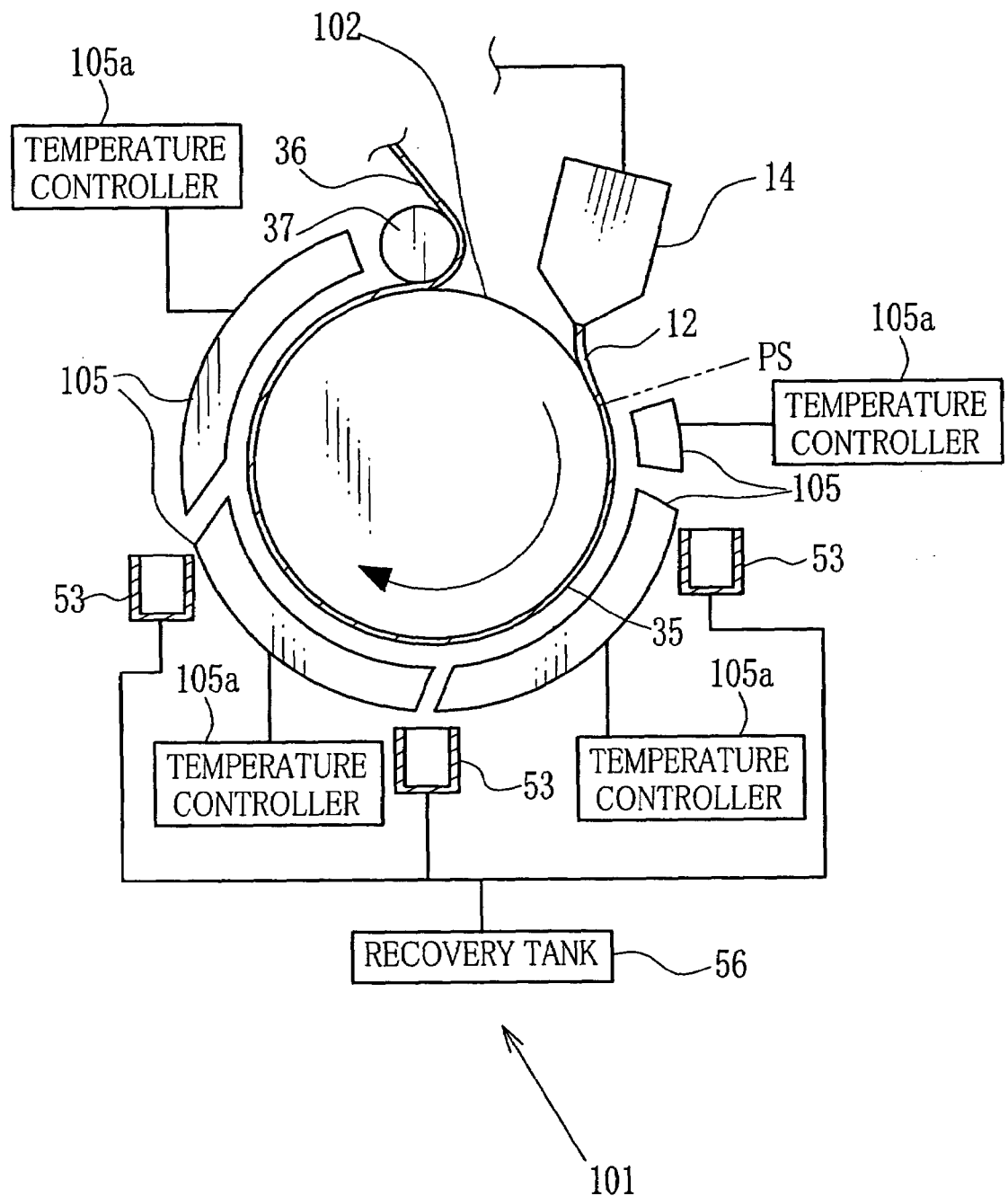
FIG. 11 is a partial plan view of a third embodiment of a casting equipment of the present invention.

Further, the present invention is also effective when a drum is used as the substrate. In FIG. 11, a casting equipment 101 is provided with a drum 102 as the substrate. In these figures, the same devices and members as in FIG. 2 are provided with the same numbers and the explanations therefor are omitted. The casting dope 12 discharged from the casting die 14 forms the gel-like film 35 on the drum 102. The casting position PS is slightly lower than a top of the drum 102, and at first the gel-like film 35 is transported downwards from the casting position PS. Also in this case, the casting position PS is preferably determined such that a tangential line to the drum 102 at the casting position PS may almost match a tangential line to a curve formed by the casting dope from the casting die 14 may be almost the same.

The drum 102 is connected to a temperature controller for heating a surface of the drum 102 so as to evaporate the solvent. Therefore the drum 102 has also the same effect as the heating plate in FIG. 2. In outer side from the gel-like film 35, plural condensers 105 are disposed and the condensed solvent flows on inclinations of the condensers 105, and falls into liquid receivers 53. Then the condensed solvent is recovered as the recovery solvent by the recovery tank 56. The gel-like film 35 on the rotating drum 102 is peeled as the film 36 by the peeling roller 37, and transported to the drying equipment 17 (see FIG. 1) for the next process. Thus the drip of the casting dope from the gel-like film is prevented, the gel-like film 35 is uniformly dried, and the solvent is recovered in high yield. Note that when the rotating direction of the drum is an opposite direction to this embodiment, the gel-like film 35 is transported upwards from the casting position PS at first. Also in this case, the gel-like film 35 is uniformly dried and the uniformity of the thickness of the film becomes larger. Note that the temperature of the condensers 105 are controlled by temperature controllers 105a.

Figure 12:
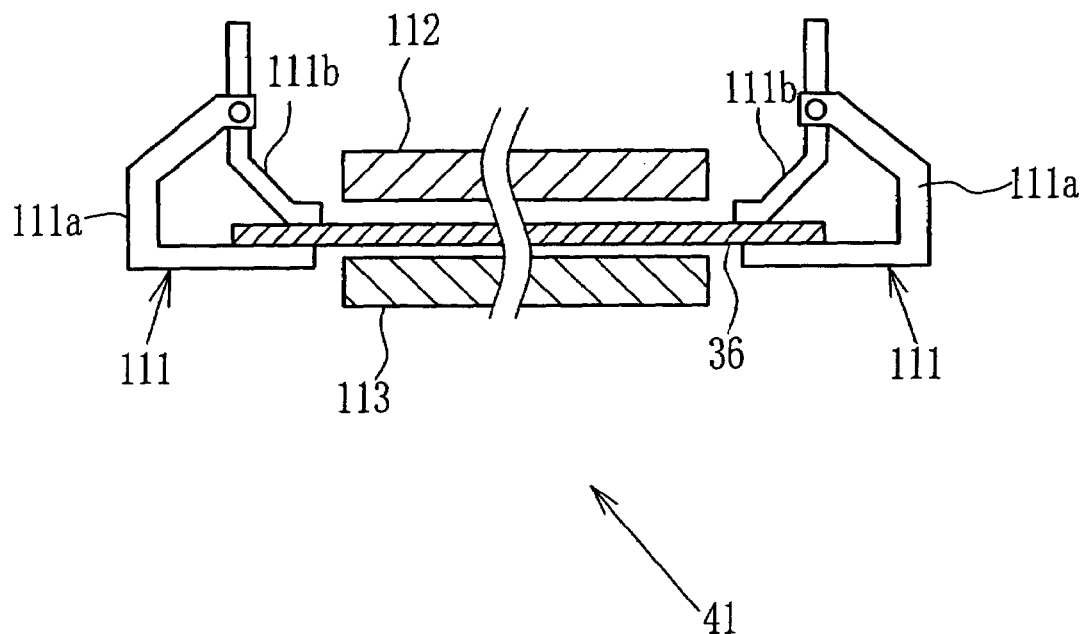
FIG. 12 is a plan and partial sectional view of a first embodiment of a tenter apparatus.

Further, the present invention is also applied to the tenter apparatus 41 in the drying equipment 17 so as to dry the film 36 therein. As shown in FIG. 12, each clip tenter 111 has a main body 111a and a clip member 111b. In the tenter apparatus 41, side portions of the film 36 are clipped by the clip tenters 111, namely, sandwiched between the main bodies 111a and the clip members 111b, and the film 36 is transported and drawn by moving the clip tenters 111. The tenter apparatus 41 further includes a heating plate 112 for evaporating the solvent in the film 36 and a condenser 113 for condensing the solvent vapor. Thus the film 36 has the uniform thickness adequate for the optical use, and the recovery of the solvent is also made in the drying equipment 17. Therefore the application of the present invention to the tenter apparatus 41 is effective.

Figure 13:
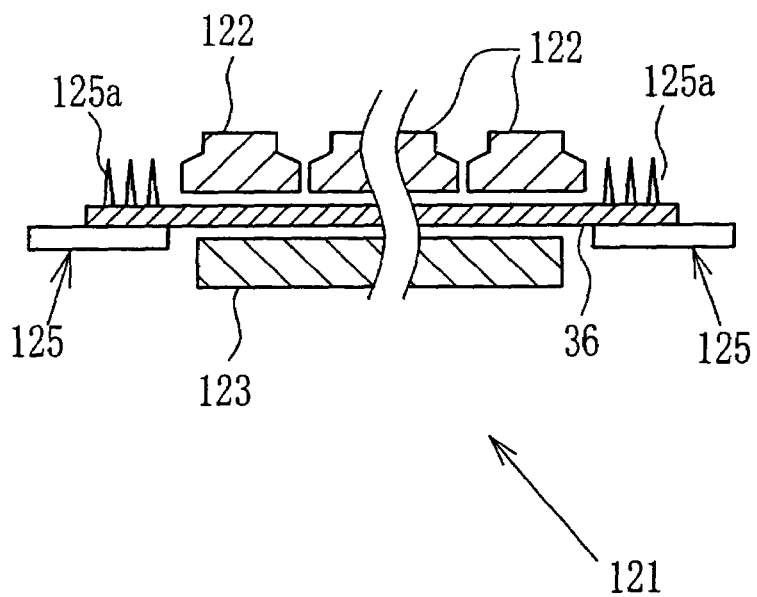
FIG. 13 is a plan and partial sectional view of a second embodiment of a tenter apparatus.

Further, the heating means is not restricted in the heating plate 112. As shown in FIG. 13, microwave guide 122 are used as the heating means for heating the film 36. The microwave guide 122 irradiate microwave to the film 36 such that the energy of the molecules of the solvent contained in the film 36 may become higher and thus the solvent is evaporate. The solvent vapor is condensed by a condenser 123.

The present invention is also effective when applied to several other tenter apparatuses instead of the tenter apparatus 41 having the clip tenters 111 in FIG. 12. As shown in FIG. 13, a tenter apparatus 121 includes pin tenters 125. Each pin tenter 125 has plural pins 125a for fixing the film 36 to the pin tenter 125. Note that the microwave guide are not only used in the tenter apparatus, and may be used also in the casting apparatus so far as the power of the generated energy is enough.

The film obtained in the above method can be used as a protective film for polarizing filter. The polymer as a main content of a polarized film of the polarizing filter is especially preferable polyvinyl alcohol type polymer. As the polyvinylalcohol type polymers, there are not only polyvinyl alcohol, but also alkyl denatured polyvinylalcohol. Further, the polyvinylalcohol type polymers are usually produced by saponificating polyvinyl acetate to which vinylacetate is polymerized. However, the polyvinylalcohol type polymers may be produced in polymerization of vinyl acetate with small amount of the unsaturated carboxylic acid, their derivatives (for example, salts, esters, amides, nitrils and the like), olefins, vinyl ethers, salts of unsaturated sulfonic acids. Alkyl denatured polyvinylalcohols have alkylgroup at an end of molecule thereof, and saponification degree is at least 80%, and polymerization degree is at least 200.

There are other polymers than polyvinyl alcohol type polymer, which can be used for the polarized film of the present invention, for example, polycarbonate type polymers, cellulose type polymer and the like.

When the polyvinylalcohol type polymers are used as the main content of the polarized film 12, the polarized film may be stained by a gas phase adsorption method or a liquid phase adsorption method. In this embodiment, the polarized film is stained by the liquid phase adsorption method. However, the present invention does not depend on these methods.

In the staining by the liquid phase adsorption method of this embodiment, iodine is used. However, the present invention is not restricted in it. The polyvinylalcohol film is dipped in the aqueous solution of iodine/potassium iodide (KI) for at least 30 seconds and at most 5000 seconds. Preferably, the concentration of iodine in the solution is from 0.1 g/L to 20 g/L, and that of potassium iodide is from 1 g/L to 100 g/L. Note that it is preferable that temperature of the solution for dipping the polyvinyl alcohol is from 5° C. to 50° C.

In the liquid phase adsorption method, a solution of iodine or other dye may be coated or sprayed on the polyvinylalcohol film in a way already known, instead of the above method of dipping the polyvinylalcohol film. The polyvinylalcohol may be colored before or after stretching. However, after being stained, the polyvinylalcohol film adequately swells and the film thereof is tensed after staining. Accordingly, it is preferable that the polyvinylalcohol film is stained before stretching.

Instead of iodine, dichroic dye (including pigment) can be used. In the dichroic dyes, there are dye materials of azo dye, stilbene dye, pyrazolone dye, triphenylmethane dye, quinoline dye, oxadine dye, tiadine dye, anthraquinone dye and the like. Preferably, the dye materials can be dissolved to water. Preferably, dichroic dye has hydrophilic group, such as sulfonic acid group, amino group, hydroxyl group and the like.

As the dichroic dye, there are CI direct yellow 12, CI direct orange 39, CI direct orange 72, CI direct red 39, CI direct red 79, CI direct red 81, CI direct red 83, CI direct red 89, CI direct violet 48, CI direct blue 67, CI direct blue 90, CI direct green 59, CI acid red 37, and the like.

Further, there are other dyes described in Japanese Patent Laid-Open Publications No. 1-161202, 1-172906, 1-172907, 1-183602, 1-248105, 1-265205, 7-261024 and the like. These dichroic dyes are used as free acids, alkali metal salt, ammonium salt, and amine salt.

When the plural dichroic dyes are mixed, then the polarizer (or polarized film) can have several color phases or hues. Preferably, the polarizing filter (or the polarizing element) has compounds such that the two polarizing filters (or the polarizing elements) may show black when they are set in cross nicol position.

When it is designated that the polyvinylalcohol type film is tensed after coloring, then compounds (or cross-linking agent) for cross-linking polyvinylalcohol is used. Concretely, the polyvinylalcohol type film is dipped into a solution of the cross-linking agent, and otherwise the cross-linking agents are coated or sprayed onto the polyvinylalcohol type film. Thus, the polyvinylalcohol type film is hardened so as to have adequate orientation. Note that the cross-linking agent of polyvinylalcohol type polymer is described in the U.S. Reissued patent application Ser. No. 232897 or may be others already known. Especially preferable are boric acid based materials.

In order to adhere the obtained film to the polarized film, there are a method of applying an adhesive agent, or a method of surface chemical treatment to supply an adhesive property for at least one of surfaces of the polarized film and the obtained film. When cellulose acylate is used as the polymer in the protective films, there are especially preferable methods for surface treatment, for example, acid treatment, alkali treatment, corona discharge treatment, glow discharge treatment, exposing to UV radiation.

In this embodiment, the film is adhered to the polarized film with the adhesive agent after the surface treatment. The surface treatment is saponification by alkali. Concretely, the film formed of cellulose acylate is dipped in alkali solution, and then neutralized in an acid solution, thereafter washed with a water, and dried. As the alkali solution, for example, sodium hydroxide and potassium hydroxide are used, and concentration thereof is preferably from 0.1N to 3.0N. Otherwise, the temperature of the alkali solution is preferably from the room temperature to 90° C.

The films are adhered to the polarized film with the adhesive agent, and the adhesive agent may be already known. Especially preferable are solutions of boron compounds or polyvinylalcohol which contain denatured polyvinylalcohol having acetoacetyl group, sulfonic acid group, carboxyl group, oxyalkylene group and the like. Preferably, the adhesive agent has thickness from 0.01 μm to 10 μm after drying, and particularly from 0.05 μm to 5 μm.

Further, the obtained film is used for an optical compensation film in which the film is coated with an antireflection layer, and for an optical functional film such as antireflection film in which an antiglare layer is formed on the obtained film. These products can be used as parts for a liquid crystal display.

In order to increase the effect of the present invention, the following embodiment is made other than the above described embodiment. Note that the present invention does not depend on the following embodiment.

[Preparation of Prepared Dope]

The method of preparing the prepared dope is usually to dissolve the polymer in a room temperature. In order to improve the uniformity of dissolving, a cool-dissolving method and a heat-dissolving method are adequately applied to the present invention.

In the cool-dissolving method, the polymer (cellulose acylate and the like), additives (particles and the like) are gradually added with stirring at nearly the room temperature from $-10°$ C. to $40°$ C. The addition of the materials may be made simultaneously or sequentially. Note that solution or dispersion of each material may be prepared, and thereafter, the solutions or dispersions may be mixed. The dispersion is prepared in a method with use of a stirring tank, for example a continuous mixing method by using a continuous jet mixer (name of product: flow jet mixer, produced by Funken Powtechs, Inc.), and the like. However, the method of preparing the dispersion is not restricted in them, when the dispersion of the dope is enough to the solution casting method of the present invention. The cooling, for example, is made in a dried ice/methanol bath ($-75°$ C.) or diethyleneglycol solution ($-30°$ C. to $-20°$ C.). Thus, the mixture of the solvent and the solid materials in the polymer solution is solidified. Thereafter, the mixture is heated to have temperature about $0°$ C. to $200°$ C., so as to obtain a solution in which the materials show fluidity in the solvent. In order to make the temperature larger, the mixture may be left in the room temperature or heated in a warm bath.

In the heat-dissolving method, the polymer (cellulose acylate and the like), additives (particles and the like) are gradually added in the solvent with stirring at nearly the room temperature from $-10°$ C. to $40°$ C. The addition of the materials may be made simultaneously or sequentially. Then the solvent is heated to have the temperature about $70°$ C. to $240°$ C. under increasing pressure by about 0.2 MPa to 30 MPa. The preferable heating temperature is $80°$ C. to $220°$ C. Then the heated solution or dispersion is cooled to have the temperature which is lower than the lowest boiling point of the used solvent components. Usually, the solution or the dispersion is cooled at $-10°$ C. to $50°$ C., to reduce the pressure to the atmospheric pressure. Preferably, cooled water is used as the cooling medium which is cooled by a cooling apparatus. Note that additives may be added if necessary.

It is preferable to make a filtration of the prepared dope obtained in the above method such that undissolved particles or the gel-like materials may be removed. As the filter medium used in the filtration, there are a filter paper, a filter cloth, a metallic mesh, a metallic fiber, non-woven cloth and the like. Further, when the criterion of the dope against the remaining of the foreign particles or the undissolved particles is strict, plural filtration apparatuses are disposed serially, and they are sequentially or respectively offline, such that the uniformity of the dope may be improved by multi-filtration.

Further, in a system in which particles are added to the prepared dope, it is preferable to make the filtration of the prepared dope containing the particles. Some sorts of particles agglutinate in effect of compatibilities to the particles oneself or to the prepared dope. Thus the agglutinated particle has the larger diameter, which is usually preferably removed. Such particles, there are silica ($SiO_2$) particles added as a matting agent.

[Solvent]

The solvent used in the present invention is hydrocarbon halides, esters, ketones, ethers, alcohols and the like. However, it is not restricted in them. The single sort of the solvent may be used (100 wt. %) as the solvent of the dope, and otherwise the several sorts of the solvents may be mixed at a predetermined mixture ratio.

As the usable solvent, there are hydrocarbon halide (for example, dichloromethane, chloroform and the like), esters (methyl acetate, methyl formate, ethyl acetate, amyl acetate, butyl acetate and the like), ketones (for example acetone, methylethylketone, cyclopentanone, cyclohexanone and the like), ethers (for example dioxane, dioxorane, tetrahydrofurane, diethyl ether, methyl-t-butyl ether and the like), alcohols (for example methanol, ethanol, isopropyl alcohol, n-propyl alcohol, n-butanol, cyclohexanol, cyclopentanol and the like), aromatic hydrocarbon (for example benzene, toluene, xylene, hexane and the like), and the like.

It is effective in the present invention that methyl acetate is used as a single solvent or as a main content of the mixture solvent. When the mixture solvent is used, the characteristics of the dope (such as the gel strength and the shear viscosity, and the like) can be easily adjusted. As the solvent of subcontents which are mixed with the methyl acetate, there are not only ketones but also alcohols (methanol, n-butanol and the like). Further, the mixture solvent may be prepared by mixing methyl acetate and at least two sorts of the solvents. Note that the main content of the mixture solvent means the solvent having the largest content ratio of the mixture solvent, and the subcontents mean the solvents which has not the largest content ratio of the mixture solvent. Further, the subcontents are not restricted in one sort of solvents.

When cellulose triacetate (TAC) is used as the polymer and methyl acetate is used as the main content of the solvent to prepare the dope, it is preferably in view of dissolubility of TAC that the content percentage of methyl acetate in the mixture solvent is 50 wt. % to 93 wt. %, that of ketones is 2 wt. % to 20 wt. % (for example acetone, methylethylketone, cyclopentanone, cyclohexanone and the like, and one of them may be used or plurality of them may be used), and that of alcohols is 5 wt. % to 30 wt. % (for example methanol, ethanol, isopropyl alcohol, n-propylalcohol, n-butanol, cyclohexanol, cyclopentanol and the like, and one of them may be used or plurality of them may be used). Further, ketones and alcohols may be mixed with at least 93 wt. % methyl acetate to obtain the mixture solvent.

When it is designated to use cellulose triacetate (TAC) as the polymer, dichloromethane can be used as a single solvent or as a main content of the mixture solvent. As TAC easily dissolves the dichloromethane, the preparation of the polymer solution is made easily. Further, the same as methyl acetate is used, when dichloromethane is used as the main content of the mixture solvent, the characteristics of the polymer solution are adjustable. Preferably, the content ratio of dichloromethane in the mixture solvent is 50 wt. % to 95 wt. %, that of ketones is 0 wt. % to 20 wt. % (for example acetone, methylethylketone, cycropentanone, cycrohexanone and the like, and one of them may be used or plurality of them may be used), and that of alcohols is 5 wt. % to 30 wt. % (for example methanol, ethanol, isopropyl alcohol, n-propyl alcohol, n-butanol, cyclohexanol, cyclopentanol and the like, and one of them may be used or plurality of them may be used). Further, ketones and alcohols may be mixed with at least 95 wt. % dichloromethane to obtain the mixture solvent.

[Additives]

Additives used in the present invention is not especially restricted. As the additives, there are plasticizers, UV-absorbing agent, matting agents, mold lubricant, fluoride type surface active agent, release agent, deterioration inhibitor, retardation adjuster, gelating agent, and the like. The additives may be mixed with the polymers in any step of preparing the dope solution, and otherwise, may be added to the casting dope just before the casting is made. For example, the additives may be added when the polymer is swollen, and otherwise, may be added to the casting dope and mixed by a static mixer when or just before the casting solution is cast from a casting die onto the substrate in a film production process.

[Plasticizer]

As the plasticizer used in the present invention, there are phosphoric acid ester types (for example triphenylphosphate (TPP), tricresyl phosphate, cresyldiphenyl phosphate, octyldiphenylphosphate, biphenyldiphenyl phosphate (BDP), trioctylphosphate, tributylphosphate and the like), phthalic acid ester types (for example diethylphthalate, dimethoxyethylphthalate, dimethylphthate, dioctylphthalate and the like), grycolic acid ester types (for example triacetine, tributyline, butylphthalylbutylgrycolate, ethylphthalylethylgrycolate, methylphthalylethylgrycolate, butylphthalylbutylgrycolate and the like) and other plasticizers.

Only one of the plasticizer may be used, and otherwise plural plasticizers may be mixed. The plasticizers are preferably contained 1-20 wt. % to the polymer in the dope solution. Further, other plasticizers described in Japanese Patent Laid-Open Publication No. 11-80381, 11-124445, 11-248940 may be also used.

[UV-Absorbing Agent]

In the present invention, preferably, one or more UV-absorbing agent is preferable to be contained in the solution. In view of the protection of the deterioration of liquid crystal compounds, the UV-absorbing agent is preferably excellent in absorbing UV-ray whose wave length is equal or less than 370 nm. Further, in view of the displayability of the liquid crystal, the UV-absorbing agent preferably does not absorb visible ray whose wave length is equal or more than 400 nm.

As the UV-absorbing agent, there are, for example, oxybenzophenone type compounds, benzotriasol type compounds, salicylic acid ester type compounds, benzophenone type compounds, cyanoacrylate type compounds, nickel complex salt type compounds. Particularly preferable are benzotriasol type compounds and benzophenone type compounds. Especially preferable are benzotriazol type compounds, as they don't unexpectedly carry out the coloring of the cellulose ester. Further there are UV-absorbing agent of benzotriasol type compounds disclosed in Japanese Patent-Laid Open Publication No. H08-29619 and UV-absorbing agent disclosed in Japanese Patent Laid-Open Publication No. H08-239509. Furthermore, other UV-absorbing agents already known can be added. The content of UV-absorbing agents is preferably contained in 0.1-10 wt. % to the polymer.

As the preferable UV-absorbing agent, there are, 2,6-di-tert-butyl-p-crezol, pentaerythrytyl-tetrakis[3-(3,5-di-tert-butyl-4-hydroxyphenyl)propionate], triethyleneglycol-bis[3-(3-tert-butyl-5-methyl-4-hydroxyphenyl)propionate], 1,6-hexanediol-bis[3-(3,5-di-tert-butyl-4-hydroxyphenyl) propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], 2(2'-hydroxy-3', 5'-di-tert-butylphenyl)-5-chlorobenzotriazol, 2(2'-hydroxy-3',5'-di-tert-amylphenyl)-5-chlorobenzotriazol, octadecyl-3-(3,5-di-tert-butyl-4-hydroxyphenyl)propionate, N,N'-hexamethylenebis(3,5-di-tert-butyl-4-hydroxy-hydrocynenamide), 1,3,5-trimethyl-2,4,6-tris(3,5-di-tert-butyl-4-hydrozybenzil)benzene, tris(3,5-di-tert-butyl-4-hydroxybenzil)-isocianulate, and the like. Especially preferable are 2,6-di-tert-butyl-p-crezol, pentaerythrytyl-tetrakis[3-(3,5-di-tert-butyl-4-hydroxyphenyl)propionate], triethyleneglycol-bis[3-(3-tert-butyl-5-methyl-4-hydroxyphenyl)propionate]. Further, metal deactivators of hydradine compounds (such as N,N'-bis[3-(3,5-di-tert-butyl-4-hydroxyphenyl)propionyl]hydradine and the like), and phosphate processing stabilizer (such as tris(2,4-di-tert-butylphenyl) phosphate and the like) may be mixed and used.

[Matting Agent]

The dope solution preferably contains matting agent (particle powders) for improving an adhering endurance property under high moisture and a slipping property of the film. An averaged height of umbones of the matting agent on a surface is preferably 0.005-10 μm, particularly 0.01-5 μm. The number of the umbones is preferably large. However, when it is larger than necessary, the umbones cause the haze. Further, the primary diameter of the particle is preferably 1 nm to 500 nm. However, the present invention is not restricted in the description. The matting agent may be inorganic and organic compounds. As inorganic matting agents, there are inorganic particles, such as barium sulfate, manganese colloid, titanium dioxide, strontium sulfate, silicon oxide type (silicon dioxide and the like), aluminum oxide, zinc oxide, tin oxide, calcium carbonate, barium sulfate, talc, caoline, calcium sulfate. Further, there are silicone dioxide, (for example synthetic silica obtained in wet processing or by gelating silicic acid) and titanium dioxide (rutile type, anatase type) produced from titanslag and sulfuric acid.

The inorganic matting agent may be obtained also by milling inorganic compound whose diameter is more than 20 μm. In this case, after the milling, the classification of inorganic compound is carried out for example by vibrating filtration, wind power classification.

As the organic compound, there are organic polymer compounds which is milled and classified, for example, polytetrafluoroethylene, cellulose acetate, polystyrene, polymethyl methacrylate, polypropyl methacrylate, polymethyl acrylate, polyethylene carbonate, acrylstyrene type resins, silicone type resins, polycarbonate type resins, benzoguanamine type resins, melamine type resins, polyolefin type powders, polyester type resins, polyamide type resins, polyimide type resins, polyfluoroethylene type resins and starch. There are further polymer synthesized in suspension polymerization, polymers having ball shape that are obtained in spray drying method or dispersing method, and inorganic compounds. However, when the amount of the particle powders is too large in the dope solution, the flexibility of the film becomes lower. Accordingly, the dope solution preferably contains the particle powders in 0.01-5 wt. % to the polymer.

[Mold Lubricant]

Mold lubricants are often added to the dope in order to make the molding more easily. In the mold lubricants there are waxes having high boiling points, higher fatty acid and salt form thereof, esters, silicone oil, polyvinyl alcohol, low molecular weight polyethylene, derivatives of vegetable proteins and the like. However, the present invention is not restricted in them. It is preferable to adjust the quantity of mold lubricant to be added such that the weight percentage of the mold lubricant to the polymers in the dope may be in the range of 0.001 wt. % to 1 wt. %, since the mold lubricants have influences on the brilliance and smoothness of the film.

[Fluoride Surface-Active Agents]

In the dope, fluoride surface-active agents may be also added. The fluoride surface-active agents have a hydrophobic group of fluorocarbon chain, and therefore is used as coating agent in organic solvent or a antistatic agent while it decreases a surface tension. As the fluoride surface-active agent there are, for example, $C_8F_{17}CH_2CH_2O-(CH_2CH_2O)_{10}-OSO_3Na$, $C_8F_{17}SO_2N(C_3H_7)(CH_2CH_2O)_{16}-H$, $C_8F_{17}SO_2N(C_3H_7)CH_2COOK$, $C_7F_{15}COONH_4$, $C_8F_{17}SO_2N(C_3H_7)(CH_2CH_2O)_4-(CH_2)_4-SO_3Na$, $C_8F_{17}SO_2N(C_3H_7)(CH_2)_3-N^+(CH_3)_3.I^-$, $C_8F_{17}SO_2N(C_3H_7)CH_2CH_2CH_2N^+(CH_3)_2-CH_2COO^-$, $C_8F_{17}CH_2CH_2O(CH_2CH_2O)_{16}-H$, $C_8F_{17}CH_2CH_2O(CH_2)_3-N^+(CH_3)_3.I^-$, $H(CF_2)_8-CH_2CH_2OCOCH_2CH(SO_3)COOCH_2CH_2CH_2-(CF_2)_8-H$, $H(CF_2)_6CH_2CH_2O(CH_2CH_2O)_{16}-H$, $H(CF_2)_8CH_2CH_2O(CH_2)_3-N^+(CH_3)_3.I^-$, $H(CF_2)_8CH_2CH_2OCOCH_2CH(SO_3)COOCH_2CH_2CH_2C_8F_{17}$, $C_9F_{17}-C_6H_4-SO_2N(C_3H_7)(CH_2CH_2O)_{16}-H$, $C_9F_{17}-C_6H_4-CSO_2N(C_3H_7)-(CH_2)_3-N^+(CH_3)_3.I^-$.

The amount of the fluoride surface-active agent in the dope solution is preferably 0.001-1 wt. % to the polymer.

[Release Agent]

The release agents may be added to the dope so as to decrease the peeling force. As the release agent, surface-active agents are especially preferable. There are phosphoric acid type, carboxylic acid type, nonionic type, cationic type and the like in the release agent. However the release agents are not restricted in them. These releasing agents are described in Japanese Patent Laid-Open Publication No. 61-243837. Further, Japanese Paten Laid-Open Publication No. 57-500833 teaches polyethoxylic phosphoric acid ester as release agent. In the Japanese Paten Laid-Open Publication No. 61-69845, the peeling is smoothly made by adding to cellulose ester mono/diphosphoric acid alkylester in which non-esterified hydroxylic group has a free acid form. Further, in Japanese Patent Laid-Open Publication No. 1-299847, a peeling force is decreased by adding inorganic particles and phosphoric acid ester compounds having non-esterified hydroxylic group and propyreneoxide chain. These materials can be used as the release agent. The amount of the release agent is 0.001-1 wt. % to the polymer.

[Deterioration Inhibitor]

Further, deterioration inhibitors (antioxidant, peroxide decomposer, radical inhibitor, metal deactivator, acid capture, amine and the like) and UV-stabilizer may be added to the dope. Such deterioration inhibitors and UV-stabilizers are disclosed in Japanese Patent Laid-Open Publication No. 60-235852, 3-199201, 5-1907073, 5-194789, 5-271471, 6-107854, 6-118233, 6-148430, 7-11056, 7-11055, 7-11056, 8-29619, 8-239509 and 2000-204173. The especially preferable deterioration inhibitor is butylized hydroxyl toluene (BHT). Further, it is preferable to prepare the polymer solution which contains 0.01 wt. % to 5 wt. % deterioration inhibitor to the polymer.

(Retardation Adjuster)

In the present invention, the nonuniformity of the retardation is reduced. Furthermore, retardation adjuster may be added to the dope for controlling the optical anisotropy. The retardation adjuster increases the retardation average of the produced film. Aromatic compounds having at least two aromatic groups are preferably used as the retardation adjuster. Further, at least two sorts of aromatic compounds may be simultaneously used. In the aromatic group of the aromatic compounds, there are not only the aromatic hydrocarbon group, but also heterocyclic group having character of aromatic hydrocarbon. Note that it is preferable to prepare the polymer solution which contains 0.01 wt. % to 10 wt. % retardation adjuster to the polymer.

The aromatic hydrocarbon group is especially preferably 6-membered ring (benzene ring). The heterocyclic group having character of aromatic hydrocarbon group is preferably 5-membered ring, 6-membered ring, or 7-membered ring, and especially preferably 5-membered ring, or 6-membered ring. Usually, double bonds in the heterocyclic group having character of aromatic hydrocarbon is formed at the largest number (or the maximal number). As hetero atoms used in the present invention, nitrogen atom, oxygen atom, and sulfer atom are preferable, and nitrogen atom is especially preferable. As the heterocyclic group having character of aromatic hydrocarbon, there are furan ring, thiophene ring, pyrrol ring, oxazol ring, thiazol ring, isothiazol ring, imidazol ring, pyrazol ring, furazan ring, triazol ring, pyran ring, pyridine ring, pyridazine ring, pyrimidine ring, pyradine ring, and 1,3,5-triadine cycle and the like. Concretely, as the retardation adjuster, there are 2-hydroxy-4-benzyloxybenzophenone, 2,4-benzyloxybenzophenone, and the like.

The preferable aromatic rings are benzene ring, furan ring, thiophene ring, pyrrol ring, oxazol ring, thiazol ring, imidazol ring, triazol ring, pyridine ring, pyrimidine ring, pyradine ring, and 1,3,5-triadine ring and the like. Benzene ring and 1,3,5-triadine ring are especially preferable. The aromatic compound has preferably at least 1,3,5-triadine ring.

The number of the aromatic rings in one aromatic compound is preferably 2-20, particularly 2-12, and especially 2-8. The combination of two aromatic rings are made in one of the following combination relations: (a) forming a condensation ring, (b) forming a single bond for perpendicularly combining two groups, (c) combining through a linkage group. (When Two aromatic groups are combined, a spiro linkage of them cannot be formed). The concrete groups in each combination relation are shown in followings.

As the condensation cycle in (a), there are indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzoimidazole ring, benzotriazol ring, purine ring, indazole ring, chromene ring, quinoline ring, isoquinoline ring, quinolizine ring, quinazoline ring, cinnoline ring, quinoxaline ring, phthalazine ring, pteridine ring, carbazol ring, acridine ring, phenanthrizine ring, xanthene ring, phenazine ring, phenothiazine ring, phenoxathiin ring, phenoxazine ring, and thianthrene ring. Preferable are naphthalene ring, azulene ring, indole ring, benzoxazol ring, benzothiazol ring, benzoimidazol ring and quinoline ring.

The single bond in (b) is preferably formed to combine respective carbon atoms of two aromatic rings. In order to combine two aromatic rings, two or more single bonds may be formed, such that aliphatic ring on nonaromatic heterocyclic ring may be formed between the two aromatic rings.

The linkage group in (c) is preferably combined with respective carbon atoms of two or more aromatic rings. The linkage groups are alkylene group, alkenylene group, alkynylene group, —CO—, —O—, —NH—, —S—, and combinations thereof. The examples of the combinations of linkage groups are shown as (c-1) to (c-15) in the following. Note that the positions of the right and left sides in each linkage group may be converse.
(c-1): —CO—O—
(c-2): —CO—NH—
(c-3): -alkylene-o-
(c-4): —NH—CO—NH—
(c-5): —NH—CO—O—
(c-6): —O—CO—O—
(c-7): —O-alkylene-O—
(c-8): —CO-alkenylene-
(c-9): —CO-alkenylene-NH—
(c-10): —CO-alkenylene-O—
(c-11): -alkylene-CO—O-alkylene-O—CO-alkylene-
(c-12): —O-alkylene-CO—O-alkylene-O—CO-alkylene-O—
(c-13): —O—CO-alkylene-CO—O—
(c-14): —NH—CO-alkenylene-
(c-15): —O—CO-alkenylene- The aromatic rings and linkage groups may have substituents. As the substituents, there are halogene atoms (F, Cl, Br, I), hydroxyl group, carboxyl group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxycarbonyl amino group, alkylthio group, alkyl sulfonyl group, aliphatic amide group, aliphatic sulfonamide group, aliphatic substiteted amino group, aliphatic substituted carbamoyl group, aliphatic substituted sulfamoyl group, aliphatic substituted ureido group, and nonaromatic linkage rings.

The number of carbon atoms in one alkyl group is preferably 1 to 8. Chain alkyl group, especially straight chain alkyl group is preferable to cyclic alkyl group. Further, the alkyl group may have substituent (for example, hydroxy group, carboxy group, alkoxy group, alkyl substituted amino group). As the alkyl groups including the substituted alkyl groups, there are methyl group, ethyl group, n-butyl group, n-hexyl group, 2-hydroxyethyl group, 4-carboxybutyl group, 2-methoxyethyl group, and 2-diethylaminoethyl group. The number of the carbon atoms in the alkenyl group is preferably 2 to 8. Chain alkenyl group, especially straight chain alkenyl group is preferable to cyclic alkenyl group. The alkenyl group may have substituent. As the alkenyl groups, there are vinyl group, allyl group, and 1-hexenyl group. The number of the carbon atoms in the alkinyl group is preferably 2 to 8. Chain alkynyl group, especially straight chain alkynyl group is preferable to cyclic alkynyl group. The alkynyl group may have substituent. As the alkynyl groups, there are ethynyl group, 1-butynyl group and 1-hexynyl group.

The number of the carbon atoms in the aliphatic acyl group is preferably 1 to 10. As the aliphatic acyl groups, there are acetyl group, propanoyl group and butanoyl group. The number of the carbon atoms in the aliphatic acyloxy group is preferably 1 to 10. As the aliphatic acyloxy groups, there is acetoxyl group. The number of the carbon atoms in the alcoxy group is preferably 1 to 8. The alcoxy group may contain substituents (for example alcoxy group). As the alcoxy groups containing the substituted alcoxy groups, there are methoxy group, ethoxy group, butoxy group, and methoxyethoxy group. The number of the carbon atoms in the alcoxycarbonyl group is preferably 2 to 10. As the alcoxycarbonyl groups, there are methoxycarbonyl group and ethoxycarbonyl group. The number of the carbon atoms in the alcoxycarbonyl amino group is preferably 2 to 10. As the alcoxycarbonyl amino groups, there are methoxycarbonyl amino group and ethoxycarbonyl amino group.

The number of the carbon atoms in the alkylthio group is preferably 1 to 12. As the alkylthio groups, there are methylthio group, ethylthio group and octylthio group. The number of the carbon atoms in the alkylsulfonyl group is preferably 1 to 8. As the alkylsulfonyl groups, there are methanesulfonyl group and ethanesulfonyl group. The number of the carbon atoms in the aliphatic amide group is preferably 1 to 10. As the aliphatic amide groups, there is acetamide. The number of the carbon atoms in the aliphatic sulfonamide group is preferably 1 to 8. As the aliphatic sulfonamide groups, there are methanesulfonamide group, butansulfonamide group, and n-octanesulfonamide group. The number of the carbon atoms in the aliphatic substituted amino group is preferably 1 to 10. As the aliphatic substituted amino groups, there are dimethylamino group, diethylamino group, and 2-carboxyethylamino group. The number of the carbon atoms in the aliphatic substituted carbamoyl group is preferably 2 to 10. As the aliphatic substituted carbamoyl groups, there are methyl carbamoyl group and diethyl carbamoyl group. The number of the carbon atoms in the aliphatic substituted sulfamoyl group is preferably 1 to 8. As the aliphatic substituted sulfamoyl groups, there are methyl sulfamoyl group and diethyl sulfamoyl group. The number of the carbon atoms in the aliphatic substituted ureido group is preferably 2 to 10. As the aliphatic substituted ureido groups, there is methyl ureido group. As the nonaromatic heterocyclic ring groups, there are piperidino and morpholino. The molecular weight of the retardation adjuster is preferably 300 to 800. Concretely, the retardation adjuster is disclosed in Japanese Patent Laid-Open Publications No. 2000-111914, 2000-275434, and International Patent Application WO00/65384.

(Measuring Method of Concentration of Solid Material in Dope)

In order to measure the concentration of the solid materials in the dope, a predetermined volume of the dope is extracted as a sample from a film production line, and a weight of the sample is measured. Thereafter, the sample is heated at 120° C. for two hours, and the weight of the remaining materials is measured. Then a ratio of the weight of the remaining materials to that of the sample is obtained. Note that in the present invention the solid materials are a mixture of the additives and the polymers as the raw materials of the film. A pure material of each of them is not always solid material in the room temperature. Further, the present invention does not depend on the measuring method of concentration of solid material.

[Experiment]

The experiment of the present invention was made as follows. However, the present invention is not restricted in the experiment.

Three dopes A, B, C were prepared from the following components. Note that the raw material of cellulose triacetate used for the dopes A, B was wood pulp and that for the dope C was cotton linter. Further, the UV-absorbing agents I, II, III were respectively 2-(2'-hydroxy-5'-methylphenyl) benzotriazol, 2,2'-dihydroxy-4-methoxybenzophenon, and 2(2'-hydroxy-3',5'-di-tert-butylphenyl)-5-chlorobenzotriazol. These UV-absorbing agents I, II, III had also the effects of the retardation adjuster.

(Preparation of Dope A)

The contents of preparing the dope A were in below. At first, a mixed solvent of the methylene chloride, methanol, ethanol and n-butanol was cooled to 0° C., and solid materials were added to the mixture solvent with stirring to disperse uniformly the solid materials. Thereafter, the pressure to the dispersion was increased to 20 kg/cm$^2$, and simultaneously the dispersion was heated to two preset temperatures with a pipe including static mixers. Thus the solid materials were dissolved to obtain a dope. The preset temperatures were at first 70° C. and thereafter 38° C. Further, the dope was sequentially cooled to two preset temperatures, and thereafter the filtration was made with use of a filter paper whose absolute pore diameter was 10 μm. The present temperatures of the cooling was at first 70° C. and thereafter 38° C. The filtrated solution was heated to make the flash-evaporation. Thus part of solvent was evaporated, and the concentration of the solid content was made to 23%. Thereafter, the filtration was made with use of a sintered metal filter whose absolute pore diameter was 5 μm, so as to obtain the dope A.

| | |
|---|---|
| Cellulose triacetate | 18.90 pts. wt. |
| (degree of acetylation, 60.7%, degree of polymerization 315, degree of substitution for acetyl group at 6$^{th}$ position 0.94, averaged diameter of particle 0.5 mm) | |
| Triphenylphosphate (TPP) | 1.00 pts. wt. |
| Biphenyldiphenylphosphate (BDP) | 0.60 pts. wt. |
| Diethylphthalate | 0.50 pts. wt. |

-continued

| | |
|---|---|
| UV-absorbing agent I | 0.10 pts. wt. |
| UV-absorbing agent II | 0.20 pts. wt. |
| UV-absorbing agent III | 0.30 pts. wt. |
| particles of silicon dioxide | 0.05 pts. wt. |
| (particle diameter 15 nm, mohs hardness about 7) | |
| partial ester form of ethyl citrate | 0.02 pts. wt. |
| tribenzylamine | 0.30 pts. wt. |
| methylene chloride | 60.90 pts. wt. |
| methanol | 15.60 pts. wt. |
| ethanol | 1.20 pts. wt. |
| n-butanol | 0.40 pts. wt. |

(Preparation of Dope B)

The contents of preparing the dope B were in below. At first, a mixed solvent of the methyl acetate, methanol, ethanol, n-butanol and acetone was cooled to −20° C., and to the mixture solvent were added solid materials and diatomaceous earth as a filter aid with a continuous kneader. Note that particles of the diatomaceous earth had averaged diameter 60 μm, and the content of the diatomaceous earth to total of the solid materials and the diatomaceous earth was 0.2%. Thereafter, the mixture was dispersed with stirring, and cooled to −90° C. by a screw extruding machine with cooling jackets, to become a gel-like material. The gel-like material was heated to two preset temperatures, at first to 70° C. and thereafter to 135° C. Then the filtration of the mixture was made with use of non-woven cloth pre-coated with Teflon (trade name), so as to remove the particles of 60 μm diameter of the diatomaceous earth. Note that in the non-woven cloth an absolute pore diameter was 20 μm. Thereafter, the filtration of the filtered solution was made with use of a sintered metal filter whose absolute pore diameter was 2.5 μm. Then the filtered solution was cooled to two preset temperatures, at first to 70° C., and thereafter to 30° C., so as to obtain the dope B. Note that the cellulose acetate propionate (used as the polymer) whose content was shown below was made from pulp.

| | |
|---|---|
| Cellulose triacetate | 18.90 pts. wt. |
| (total degree of acetylation, 2.83, degree of polymerization 270, degree of substitution for acetyl group at 6$^{th}$ position 0.86, averaged diameter of particle 0.5 mm) | |
| cellulose acetate propionate | 5.90 pts. wt. |
| (total degree of acylation, 2.89, degree of acetylation, 2.59, degree of polymerization 270, degree of substitution for acetyl group at 6$^{th}$ position 0.94, averaged diameter of particle 0.5 mm) | |
| dipentaerithritol hexaacetate | 1.00 pts. wt. |
| Triphenylphosphate (TPP) | 1.00 pts. wt. |
| Biphenyldiphenylphosphate (BDP) | 0.10 pts. wt. |
| Diethylphthalate | 0.10 pts. wt. |
| UV-absorbing agent I | 0.10 pts. wt. |
| UV-absorbing agent II | 0.20 pts. wt. |
| UV-absorbing agent III | 0.30 pts. wt. |
| particles of silicon dioxide | 0.05 pts. wt. |
| (particle diameter 15 nm, Mohs hardness about 7) | |
| partial ester form of ethyl citrate | 0.02 pts. wt. |
| tribenzylamine | 0.30 pts. wt. |
| methyl acetate | 62.10 pts. wt. |
| methanol | 4.00 pts. wt. |
| ethanol | 5.00 pts. wt. |
| n-butanol | 3.00 pts. wt. |
| aceton | 5.00 pts. wt. |

(Preparation of Dope C)

The contents of preparing the dope C were in below. Note that the dope C was prepared in the same method as the dope A.

| | |
|---|---|
| Cellulose triacetate | 19.00 pts. wt. |
| (total degree of acylation, 2.5, degree of polymerization 250, degree of substitution for acetyl group at $6^{th}$ position 0.86, averaged diameter of particle 0.5 mm) | |
| particles of silicon dioxide | 0.05 pts. wt. |
| (particle diameter 15 nm, mohs hardness about 7) | |
| partial ester form of ethyl citrate | 0.02 pts. wt. |
| tribenzylamine | 0.30 pts. wt. |
| methylene chloride | 60.90 pts. wt |
| methanol | 15.60 pts. wt. |
| ethanol | 1.20 pts. wt. |
| n-butanol | 0.40 pts. wt. |

(Preparation of Dope D)

The dope A was diluted inline with use of a static mixer such that the concentration of the solid materials might become 19.5%. Thus the dope D was obtained. The contents of the solvent used for the dilution were the same as the mixture solvent of the dope A.

(Preparation of Dope E)

The dope B was diluted inline with use of a static mixer such that the concentration of the solid materials might become 19.5%. Thus the dope E was obtained. The contents of the solvent used for the dilution were the same as the mixture solvent of the dope B.

Example 1

(Film Producing Method)

The casting was made with a coat hanger die in FIG. 4 that was provided with a feed-block for performing the co-casting to form three layers. The substrate was the drum 102 as illustrated in FIG. 11, and the hard chromium plating was made on a surface of the drum 102. The mirror finishing was made such that the centerline average roughness was 0.03 μm. Note that in the drum 102 the surface temperature was kept at 5° C., the diameter was 1800 mm, and the width was 1000 mm.

It was designated that the film 36 might have first-third layers 35a-35c which were respectively formed from the dope C, the dope A and the dope C, such that after the drying the thickness of the first and third layers 35a, 35c were 1.5 μm, and that of the second layer 35b was 57 μm. The dope A and the dope C were fed to the feed block 62, and cast onto the drum 102 to be 1580 mm in width. Thereby the relative velocity of the drum 102 to the lip of the casting die 14 was adjusted to 30 m/minute. Further, plates were provided such that the flow of air occurring by moving the drum 102 did not escape from the edges of the casting surface.

The solvent was evaporated from the gel-like film 35, and the solvent vapor was condensed by the condensers 105 which were disposed 5.0 mm apart from the gel-like film 35 and cooled to at the temperature of −25° C. The condensed solvent was received by the liquid receivers 53. Thereby the temperature gradient Q was 35 and the difference thereof in the widthwise direction was 5%, and the difference of the temperature Tc of the condenser 95 in widthwise direction was 5° C. The wind speed between the gel-like film 35 and the condensers 105 was at most 0.5 m/s.

The casting equipment 101 was provided in an air tight casing through which small quantity of nitrogen gas flew. Thus in the inner atmosphere the oxygen concentration was kept at most 6 vol.%, and the dew point was kept at most −35° C.

The gel-like film 35 containing the solvent of 250 wt. % was peeled as the film 36 from the drum 102 at peeling force of 60N. Thereafter each pin tenter 125 pined the side edge portions of the film 36. Then the film 36 was heated to dry in two steps, namely at first at 80° C. and then 120° C. Then, the film 36 was transported into the roller drying apparatus 42 in which the heat-drying and the cooling were made with application of tension at 110N. The heat-drying in the roller drying apparatus 42 was made in two steps, namely at first at 120° C., and then at 135° C. The cooling was made at 25° C. The cooled film 36 was wound by the winding apparatus 47.

Example 2

(Film Production Method)

The casting was made with the casting equipment in FIG. 2. The belt 31 was made of stainless. The mirror finishing was made such that the centerline average roughness was 0.03 μm. Note that the surface temperature of the heating plate 25 was kept at 25° C. with use of a radiant heater. The belt 31 was 10 m in length and 800 mm in width.

It was designated that the film 36 might have first-third layers 35a-35c which were respectively formed from the dope B and the dope C, such that after the drying the thickness of the first and third layers 35a, 35c were 1.5 μm, and that of the second layer 35b was 37 μm. The dope B and the dope C were fed to the feed block 62, and cast onto the belt 31 to be 650 mm in width. Thereby the relative velocity of the belt 31 to the lip of the casting die 14 was adjusted to 6 m/minute. Further, plates for shielding the unexpected flow of air were provided such that the flow of air occurring by moving the belt 31 did not escape from the side edges of the casting surface.

The solvent was evaporated from the gel-like film 35, and the solvent vapor was condensed by the condensers 52 which were disposed 5.0 mm apart from the gel-like film 35 and cooled at −5° C. The condensed solvent was received by the liquid receivers 53. Thereby the temperature gradient Q was 30 and the difference thereof in the widthwise direction was 5%. The difference of the temperature Tc of the condenser 52 in widthwise direction was 5° C. The wind speed between the gel-like film 35 and the condensers 52 was at most 0.5 m/s.

The casting equipment 16 was provided in an air tight casing through which small quantity of nitrogen gas flew. Thus in the inner atmosphere the oxygen concentration was kept at most 6 vol. %, and the dew point was kept at most −15° C. The gel-like film 35 containing the solvent of 150 wt. % was peeled as the film 36 from the drum 102 at peeling force of 40N. Other conditions were the same as Example 1.

Example 3

(Film Production Method)

The first and third layers 35a, 35c were formed from a dope which was prepared from contents of the dope C without the UV-absorbing agents and the plasticizer. The casting of the dope was made such that the first and the third layers 35a, 35c were 0.5 μm and 1.5 μm in thickness after the drying. The second layer 35b was formed from the dope A so as to be 28 μm in thickness after the drying. Other conditions were the same as Example 1.

Example 4

(Film Production Method)

The first layer 35a was formed from a dope which was prepared from contents of the dope C without the UV-absorbing agents and the plasticizer. The casting of the dope was made such that the first layer 35a was 1.5 μm in thickness after the drying. The second layer 35b was formed from the dope A so as to be 57 μm in thickness after the drying. The third layer 35c was formed from the dope E so as to be 0.2 μm in thickness after the drying. The co-casting was made to form the first-third layers 35a-35c. Other conditions were the same as Example 1.

Example 5

(Film Production Method)

The first and third layers 35a, 35c were formed from a dope which was prepared from contents of the dope D without the UV-absorbing agents and the plasticizer. The casting of the dope was made such that the first and the third layers 35a, 35c were 1.0 μm and 2 μm in thickness after the drying. The second layer 35b was formed from the dope B so as to be 77 μm in thickness after the drying. The co-casting was made to form the first-third layers 35a-35c. Other conditions were the same as Example 1.

Comparison 1

(Film Production Method)

In the casting equipment 91, the condensers 95 were not used, and a drying air was blown toward the casting surface for the drying. A blowing speed and the temperature of the drying air was 15 m/s and 40° C. The drying air was cyclically used, and the solvent vapor in a discharged gas was condensed at the temperature at most −30° C. in a cooling device (not shown) for recovery of the solvent. Other conditions were the same as Example 1.

Comparison 2

(Film Production Method)

In the casting equipment 16, the condensers 52 were not used, and a drying air was blown toward the casting surface for the drying. A blowing speed and the temperature of the drying air was 10 m/s and 80° C. The drying air was cyclically used, and the solvent vapor in a discharged gas was condensed at the temperature at most −5° C. in a cooling device (not shown) for recovery the solvent. Other conditions were the same as Example 2.

Comparison 3

(Film Production Method)

The solvent vapor was condensed by the condensers 95 which were disposed 20 mm apart from the gel-like film 35 and cooled to −5° C. A percentage of the distance of the difference between the casting surface of the gel-like film 35 and condensers 95 was 11%. The temperature gradient Q was 3, and the difference of the temperature Tc of the condenser 95 in widthwise direction was 12° C.

Comparison 4

(Film Production Method)

The first and third layers 35a, 35c were formed from a dope which was prepared from contents of the dope C without the UV-absorbing agents and the plasticizer. The casting of the dope was made such that the first and the third layers 35a, 35c were 0.5 μm and 1.5 μm in thickness after the drying. The second layer 35b was formed from the dope A so as to be 28 μm in thickness after the drying. Further, in the casting equipment 91, the condensers 95 were not used, and a drying air was blown toward the casting surface for the drying. A blow-ing speed and the temperature of the drying air was 15 m/s and 40° C. The drying air was cyclically used, and the solvent vapor in a discharged gas was condensed at the temperature at most −30° C. in a cooling device (not shown) for recovery the solvent. Other conditions were the same as Example 1.

Measurement and Judgment of Thickness of Film

In Example 1-5 and Comparison 1-4, the thickness of the film was measured, and the frequency spectrum was obtained from the results of the measurement. The measurement of the thickness was made at first in a continuously running measurement in lengthwise direction in a middle area positioned between the side edges of the film, and secondary in a continuously running measurement in the widthwise direction.

The judgment of the appearance of the film was made with eyes, and the results thereof are illustrated in Table 1. In Table 1, "A" means that the appearance of the film was good, and "N" means that the unevenness was observed. In Table 1, the R1 and R2 value were calculated from the thickness values obtained in the first measurement. The R1 value was a ratio of the mean deviation of the thickness value MD1 to the thickness average TA1 of the thickness values. Further, the FFT analysis of the thickness values of the first measurement was performed to obtain the frequency spectrum in this Experiment. In Table 1, the R2 value was a ratio of the maximum $SP1_{max}$ of the frequency spectrum to the thickness average TA1. Furthermore, the R3 and R4 values were calculated from the thickness values obtained in the second measurement. The R3 value was a ratio of the mean deviation of the thickness value MD1 to the thickness average TA1. Further, the FFT analysis of the thickness values of the second measurement was performed to obtain the frequency spectrum in this Experiment. In Table 1, the R4 value was a ratio of the maximum of the frequency spectrum to the thickness average TA1.

TABLE 1

| | R1 (%) | R2 (%) | R3 (%) | R4 (%) | FA | PSA |
|---|---|---|---|---|---|---|
| Example 1 | 6.2 | 1.3 | 8.5 | 3.6 | A | A |
| Example 2 | 7.4 | 3.2 | 9.2 | 5.3 | A | A |
| Example 3 | 8.2 | 3.9 | 9.5 | 4.6 | A | A |
| Example 4 | 6.3 | 2.3 | 8.2 | 3.6 | A | A |
| Example 5 | 4.1 | 2.8 | 6.7 | 2.9 | A | A |
| Comparison 1 | 8.9 | 4.5 | 13.5 | 7.2 | N | N |
| Comparison 2 | 9.7 | 5.3 | 14.5 | 8.6 | N | N |
| Comparison 3 | 17.8 | 10.8 | 19.5 | 10.2 | N | N |
| Comparison 4 | 18.6 | 11.0 | 18.3 | 10.0 | N | N |

FA: Film Appearance
PSA: Polarizing filter Appearance

[Measurement of Retardation Value]

The retardation values of each film produced in Examples 1-5 and comparisons 1-4 were obtained in the below described methods of measuring birefringence. The retardation values Re and Rth were measured at each points at which the measurement of the thickness was performed. The result of the measurement was shown in Tables 2&3.

The retardation value Re was measured at the points arranged in the lengthwise direction. In Table 2, the R5 value was a ratio of the mean deviation MD3 of the retardation Re to the retardation average RA1. The R6 value was a ratio of the maximum $SP2_{MAX}$ of the frequency spectrum of the retardation Re to the retardation average. Further, the retardation value Re was measured at the points arranged in the lengthwise direction. In Table 2, the R7 value was a ratio of the mean deviation of the retardation Re to the retardation average. The R8 value was a ratio of the maximum of the frequency spectrum of the retardation Re to the retardation average.

Further, the retardation value Rth was measured in the lengthwise direction. In Table 3, the R9 value was a ratio of the mean deviation MD5 of the retardation Rth to the retardation average RA3. The R10 value was a ratio of the maximum of the frequency spectrum of the retardation Rth to the retardation average. Further, the retardation value Rth was measured in a continuously running measurement in the widthwise direction. In Table 3, the R11 value was a ratio of the mean deviation of the retardation Rth to the retardation average. The R12 value was a ratio of the maximum of the frequency spectrum of the retardation Rth to the retardation average.

(Measurement of Retardation Value Re)

The retardation value Re was calculated from a value of extrapolation of measured retardation value which was measured in a perpendicular direction to the film surface by radiating the 632.8 nm light. Thereby the measurement was made with an automatic birefringence meter (KOBRA21DII, produced by Oji Scientific Instrument). The frequency spectrum was obtained by performing the FFT analysis of the retardation value Re.

(Measurement of Retardation Value Rth)

The 632.8 nm light was irradiated perpendicularly to the film to obtain the retardation value Re, then the film surface was gradually inclined to the irradiated film and thereby the retardation values Re were obtained. The retardation value Rth was calculated from values of extrapolation of the measured retardation values Re. Thereby the measurement was made with an automatic birefringence meter (Ellipsometer M150, produced by Jusco Corporation). The frequency spectrum was obtained by performing the FFT analysis of the retardation value Rth.

TABLE 2

|  | R5 (%) | R6 (%) | R7 (%) | R8 (%) |
|---|---|---|---|---|
| Example 1 | 7.2 | 4.2 | 8.8 | 4.6 |
| Example 2 | 7.5 | 3.5 | 9.3 | 5.7 |
| Example 3 | 8.5 | 4.2 | 9.8 | 6.5 |
| Example 4 | 6.5 | 2.7 | 8.6 | 4.2 |
| Example 5 | 4.5 | 2.2 | 7.2 | 3.2 |
| Comparison 1 | 10.2 | 6.0 | 10.2 | 6.2 |
| Comparison 2 | 11.5 | 6.6 | 11.2 | 7.6 |
| Comparison 3 | 13.9 | 10.5 | 16.3 | 10.9 |
| Comparison 4 | 14.0 | 11.5 | 16.2 | 10.5 |

TABLE 3

|  | R9 (%) | R10 (%) | R11 (%) | R12 (%) |
|---|---|---|---|---|
| Example 1 | 6.1 | 2.6 | 8.6 | 3.2 |
| Example 2 | 7.3 | 3.3 | 9.5 | 4.0 |
| Example 3 | 8.4 | 4.5 | 9.4 | 6.0 |
| Example 4 | 6.4 | 2.9 | 7.9 | 3.0 |
| Example 5 | 4.2 | 2.5 | 6.5 | 2.7 |
| Comparison 1 | 10.8 | 6.8 | 10.5 | 7.2 |
| Comparison 2 | 11.8 | 7.2 | 12.2 | 8.3 |
| Comparison 3 | 13.2 | 10.6 | 15.9 | 13.8 |
| Comparison 4 | 14.0 | 11.1 | 15.5 | 12.6 |

[Production of Polarizing Filter]

Iodine was adsorbed to the oriented polyvinylalcohol film to produce a polarized film. Then the films produced in each Examples 1-5 and Comparisons 1-4 were adhered to both sides of the polarized film with an adhesive agent of polyvinylalcohol type such that a slow axis of the film and the transmission axis of the polarized film might be parallel. This sample of the polarizing filter was set in the atmosphere at 80° C. and the humidity of 90% RH for 500 hours. The judgment of the appearance of the sample was made with eyes, and the result thereof is shown in Table 1. Note that "A" means that the change of the color strength in the cross-nicol position was not observed, and "N" means that the change of the color strength was apparently observed.

[Estimation of Polarization Degree]

The parallel transparency Yp and the orthodoxonal transparency Yc of the polarized light in a visible area were measured with a spectrophotometer. Thereafter, a polarization degree was calculated from the following formula, based on the parallel transparency Yp and the direct transparency Yc:

$$P=[(Yp-Yc)/(Yp+Yc)]^{1/2} \times 100 \quad (\%)$$

In the polarizing filter in which the film produced in each Example 1-4 was used, the polarization degree was more than 99.6%. The polarizing filter had the enough endurance. However, in the polarizing filter in which the film produced in each Comparison 1-3 was used, the polarization degree was more than 99.4%-99.6%.

[Production of Optical Compensation Film]

Iodine was adsorbed to the drawn polyvinylalcohol film to produce a polarized film. Then the film produced in Example 1 was adhered to a surface of the polarized film with an adhesive agent of polyvinylalcohol type such that a slow axis of the film and the transmission axis of the polarized film might be parallel. Further, the saponification of the another film obtained in Example 1 was made, and thereafter the saponificated film was adhered to another surface of the polarized film with an adhesive agent of polyvinylalcohol type. Further, an optical compensation sheet (WV film produced by Fuji Photo Film Co. Ltd) was adhered to the former film (or non-saponification film) such that a slow axis of this film and that of the optical compensation sheet might be parallel. Thus the optical compensation film was obtained. Further, the optical compensation film was produced with use of the films in each Example 2-4 and comparison 1-3.

A pair of the optical compensation films obtained from the films of respective Examples 1-4 and Comparisons 1-3 were used in a liquid crystal display of TFT (thin film transistor) type. When the films of Examples 1-4 were used, the view angle and the contrast were adequate. Otherwise, when the film of Comparisons 1-3 were used, the contrast becomes lower.

[Producing Antireflection Film]

An antireflection film provided with an antiglare layer was produced in the following process by using the films in Example 1 and comparison 1.

(Preparation of Coating Solution F for Antiglare Layer)

In order to prepare a coating solution F for an antiglare layer, a mixture (DPHA, produced by NIPPON KAYAKU CO., LTD.) was used, in which dipentaerythritol pentaacrylate and dipentaerythritol hexaacrylate were mixed. The mixture of 125 g and bis(4-metacryloil thiophenyl) sulfide (MPSMA, produced by SUMITOMO SEIKA CHEMICALS CO., LTD.) of 125 g were dissolved in a mixture solvent of 439 g that contained methylethylketone of 50 wt. % and cyclohexanone of 50 wt. %. Thus a first solution was obtained. Further, second solution was prepared. In the second solution, a photoinitiator for radical polymerization (IR-GACURE 907, produced by Chiba Gaigy Japan Limited) of 5.0 g and photosensitizer (KAYACURE DETX, produced by NIPPON KAYAKU CO., LTD.) of 3.0 g were dissolved in methylethyl ketone of 49 g. The second solution was added to the first solution to obtain an added solution. The added solution was coating and thereafter cured with ultraviolet ray to obtain a coating layer, which had reflective index of 1.60.

Further, crosslinked polystyrene particles (name of product: SX-200H, produced by Soken Chemical & Engineering Co., Ltd.) of 10 g, whose average particle diameter was 2 μm, were added to the added solution, and this mixture was stirred to disperse the crosslinked polystyrene particles with a high speed stirrer for an hour. The stir speed thereof was 5000 rpm. Thereafter, the filtration of the dispersed solution was made with a polypropylene filter having pores whose diameter each was 30 μm. Then the coating solution F for antiglare layer was obtained.

(Preparation of Coating Solution G for Antiglare Layer)

A mixture solvent containing cyclohexanone of 104.1 g and methylethyl ketone 61.3 g was stirred with an air stirrer. Thereby a coating solution for hard coat (DeSolite KZ-7886A, produced by JSR corporation) of 217.0 g that contained zirconium oxide was added to the mixture solvent to obtain an added solution. The added solution was cast and thereafter cured with ultraviolet ray to obtain a coating, which had refractive index of 1.61. Further, crosslinked polystyrene particles (name of product: SX-200H, produced by Soken Chemical & Engineering Co., Ltd.) of 5 g, whose average particle diameter was 2 μm, were added to the added solution, and this mixture was stirred to disperse the crosslinked polystyrene particles with a high speed stirrer for an hour. The stir speed thereof was 5000 rpm. Thereafter, the filtration of the dispersed solution was made with a polypropylene filter having pores whose diameter each was 30 μm. Then the coating solution G for antiglare layer was obtained.

(Preparation of Coating Solution H for Antiglare Layer)

In order to prepare a coating solution H for an antiglare layer, Methylethyl ketone and cyclohexanone were mixed in ratio of 54 wt. % and 46 wt. % for using as the solvent. Further, a mixture (DPHA, produced by NIPPON KAYAKU CO., LTD.) was used, in which dipentaerythritol pentaacrylate and dipentaerythritol hexaacrylate were mixed. The solvent of 52 g was supplied with 91 g of the mixture, 199 g of hard coat solution containing zirconium oxide (DeSolite KZ-7115, produced by JSR corporation), and 19 g of hard coat solution containing zirconium oxide dispersion (DeSolite KZ-7161, produced by JSR corporation). Thus the mixture was dissolved to obtain a mixed solution. Then in the mixed solution was dissolved a photoinitiator for radical polymerization composition (IRGACURE 907, produced by Chiba Gaigy Japan Limited) of 10 g to obtain an added solution. The added solution was coated and thereafter cured with ultraviolet ray to obtain a coating, which had refractive index of 1.61.

Further, crosslinked polystyrene particles (name of product: SX-200H, produced by Soken Chemical & Engineering Co., Ltd.) of 20 g, whose average particle diameter was 2 μm, were added to a mixture solvent of 80 g, in which methylethylketone of 54 wt. % and cyclohexanone of 46 wt. % were mixed. This solution was stirred to disperse the crosslinked polystyrene particles with high speed stirrer of 5000 rpm for an hour, and added to the added solution to obtain the dispersed solution. Thereafter, the filtration of the dispersed solution was made with a polypropylene filter having pores whose diameter each was 30 μm. Then the coating solution H for antiglare layer was obtained.

(Preparation of Coating Solution I for Hard Coating)

In order to prepare a coating solution I for a hard coating, Methylethylketone of 62 g and cyclohexanone of 88 g were mixed for using as the solvent. Then, UV-ray curable hard coat composition (DeSolite KZ-7689, 72 wt. %, produced by JSR corporation) of 250 g was dissolved to the solvent. This obtained solution was coated and cured in ultraviolet ray to form a coating layer, which had refractive index of 1.53. Further, the solution was filtrated with a polypropylene filter having pores whose diameter each was 30 μm. Then the coating solution I for hard coating layer was obtained.

(Preparation of Coating Solution J for Low Reflective Index Layer)

MEK-ST of 8 g (average diameter of particles was 10 nm-20 nm, $SiO_2$ sol dispersion of methylethylketone, whose solids content degree was 30 wt. %, produced by Nissan Chemical Industries Co., Ltd.) and methylethylketone of 100 g were added to heat closslinked polymer (TN-049, produced by JSR Corporation) of 20093 g containing fluoride that had refractive index of 1.42. This mixture was stirred and filtrated with a polypropylene filter having pores whose diameter was 1 μm. Thus the coating solution J for low refractive index layer was obtained.

A surface of the film of each Examples 1-5 and Comparisons 1-4 was coated with the coating solution I by using a bar coater, and thereafter dried at 120° C. Then an UV light was applied to the coating layer on the film with air-cooled type metal halide lamp of 160 W/cm (produced by Eyegraphics Co., Ltd.). The illuminance was thereby 400 $mW/cm^2$, and illumination density was 300 $mJ/cm^2$. Thus the coating of the dope was cured to form the hard coat layer of thickness of 2.5 μm on the film. Further, the coating solution F was applied on the hard coat layer on the film with the bar coater. The coating solution F was dried and cured in the same conditions as in forming the hard coat layer. Thus the antiglare layer A of 1.5 μm was formed. Furthermore, the antiglare layer A was coated with the coating solution J for the low refractive index layer, and thereafter the coating solution J was dried at 80° C. Then the cross-linking of the film was made at 120° C. for ten minutes to form a low refractive index layer whose thickness was 0.096 μm.

The coating solution G was used for coating the film instead of the coating solution F. Other conditions were the same to form the antireflection film. In this case, an antiglare layer B was formed. Furthermore, the coating solution H was used for coating the film instead of the coating solution F. Other conditions were the same to form the antireflection film. In this case, an antiglare layer C was formed.

(Estimation of Antireflection Film)

The following examinations were made for the estimation of the respective antireflection films having the antiglare layers A, B, C. The results of the examination was shown in Table 2.

(1) Specular Reflectance and Color Tint

A spectrophotometer V-550 (produced by JASCO Corporation) was provided with an adapter ARV-474 to measure the specular reflectance at an exiting angle of −5° according to the incident light of wavelength from 380 nm to 780 nm at the incident angle of 5°. Then the average of the specular reflectance of the reflection whose wavelength was from 450 nm to 650 nm was calculated to evaluate properties of antireflection.

A reflection spectrum was obtained from a data of the observation. Then from the reflection spectrum were calculated $L^*$ number, $a^*$ number and $b^*$ number in a CIE 1976 $L^*a^*b^*$ space, which represent the color tint of the regular reflection to a light generated with an incident angle at 5° by a CIE standard light source D65. The color tint was estimated on the basis of the $L^*$ number, $a^*$ number and $b^*$ number.

(2) Integral Reflectance

Further, a spectrophotometer V-550 (produced by JASCO Corporation) was provided with an adapter ILV-471 to measure the integral reflectance according to the incident light of wavelength between 380 nm and 780 nm at the incident angle of 5°. Then the average of the integral reflectance of the reflection whose wavelength was between 450 nm and 650 nm was calculated to evaluate antireflection properties.

(3) Haze

A haze meter MODEL 1001 DP, (produced by Nippon Denshoku Industries Co., Ltd.) was used for measurement of haze of the antireflection film.

(4) Pencil Hardness

The evaluations of pencil hardness was made as described in JIS K 5400 and the data thereof was used as a criterion of scratch resistance. After the antireflection film was set in atmosphere with the temperature of 25° C. and the humidity of 60% RH for two hours, the surface of the antireflection film was scratched with a 3H test pencil determined in JIS S 6006.

fluorescent lamp (8000 cd/m$^2$) without louver emitted a light onto each antireflection film and the light reflects. An image of the fluorescent lamp formed by the reflection was observed. Thus the first estimation was made. The estimation of antiglare property was "E" (Excellent) when no outline of the illumination lamp was observed. The estimation was "G" (Good) when the outline was slightly recognized. The estimation was "P" (Pass) when the outline was not clear but recognized. The estimation was "R" (Reject) when the outline was almost clear. Further, the grade of the antiglare properties were estimated in observation of unevenness with eyes. Thus the second estimation was made.

TABLE 4

|   |   | SA | SR (%) | IR (%) | Color Tint L*/a*/b | H (%) | PH (3H) | CA | DF | 1AP/2AP |
|---|---|---|---|---|---|---|---|---|---|---|
| Ex. 1 | | A | 1.1 | 2.0 | 10/1.9/1.3 | 8 | A | 103° | 0.08 | E/G |
| | | B | 1.1 | 2.0 | 9/2.0/−4.0 | 8 | A | 103° | 0.08 | E/G |
| | | C | 1.1 | 2.0 | 9/1.7/0.2 | 12 | A | 103° | 0.07 | E/G |
| Ex. 2 | | A | 1.1 | 2.0 | 10/1.8/1.3 | 8 | A | 103° | 0.08 | E/G |
| | | B | 1.1 | 2.0 | 9/2.0/−4.0 | 8 | A | 103° | 0.08 | E/G |
| | | C | 1.1 | 2.0 | 9/1.9/0.2 | 12 | A | 102° | 0.07 | E/G |
| Ex. 3 | | A | 1.1 | 2.0 | 10/1.8/1.2 | 8 | A | 103° | 0.08 | E/G |
| | | B | 1.1 | 2.0 | 9/2.0/−4.0 | 9 | A | 102° | 0.08 | E/G |
| | | C | 1.1 | 2.0 | 9/1.7/0.3 | 11 | A | 103° | 0.07 | E/G |
| Ex. 4 | | A | 1.1 | 2.0 | 10/1.7/1.3 | 8 | A | 103° | 0.08 | E/G |
| | | B | 1.1 | 2.0 | 9/2.0/−4.0 | 9 | A | 102° | 0.08 | E/G |
| | | C | 1.1 | 2.0 | 9/1.7/0.3 | 12 | A | 102° | 0.07 | E/G |
| Ex. 5 | | A | 1.1 | 2.0 | 10/1.8/1.3 | 9 | A | 102° | 0.08 | E/G |
| | | B | 1.1 | 2.0 | 9/2.0/−3.9 | 8 | A | 102° | 0.08 | E/G |
| | | C | 1.1 | 2.0 | 9/1.6/0.2 | 12 | A | 102° | 0.07 | E/G |
| Co. 1 | | A | 1.1 | 2.0 | 10/1.9/1.3 | 8 | A | 103° | 0.08 | E/R |
| | | B | 1.1 | 2.0 | 9/2.0/−0.4 | 8 | A | 103° | 0.08 | E/R |
| | | C | 1.1 | 2.0 | 9/1.7/0.2 | 11 | A | 103° | 0.08 | E/R |
| Co. 2 | | A | 1.1 | 2.0 | 10/1.8/1.3 | 8 | A | 103° | 0.08 | E/R |
| | | B | 1.1 | 2.0 | 9/2.0/−4.0 | 9 | A | 102° | 0.07 | E/R |
| | | C | 1.1 | 2.0 | 9/1.8/0.2 | 12 | A | 102° | 0.08 | E/R |
| Co. 3 | | A | 1.1 | 2.0 | 10/1.7/1.2 | 8 | A | 103° | 0.08 | E/R |
| | | B | 1.1 | 2.0 | 9/2.0/−4.0 | 9 | A | 103° | 0.08 | E/R |
| | | C | 1.1 | 2.0 | 9/1.7/0.2 | 12 | A | 102° | 0.07 | E/R |
| Co. 4 | | A | 1.1 | 2.0 | 10/1.7/1.3 | 8 | A | 103° | 0.08 | E/R |
| | | B | 1.1 | 2.0 | 9/2.1/−4.0 | 8 | A | 103° | 0.08 | E/R |
| | | C | 1.1 | 2.0 | 9/1.8/0.2 | 12 | A | 102° | 0.08 | E/R |

Thereby a force of 1 kg was applied to the test pencil. The evaluation of the pencil hardness was "A", when no scratch remains on the surface in evaluation of n=5 (n was trial number of performances of scratching). The evaluation was "B", when one or two scratches remained on the surface in evaluation of n=5. The evaluation was "N" when more than three scratches remain on the surface in evaluation of n=5.

(5) Contact Angle

After the antireflection film was set in the atmosphere at 25° C. and the humidity of 60% RH for two hours, the contact angle to the water on the antireflection film was measured, and the data thereof was used as a criterion of antistaining, especially finger printing stain proofness.

(6) Coefficient of Dynamic Friction

After the antireflection film was set in the atmosphere with the temperature of 25° C. and the relative humidity of 60% for two hours, the coefficient of dynamic friction was measured with a machine for measuring the coefficient of dynamic friction, HEIDON-14, in which a stainless steel ball of φ5 mm was used. Thereby, the speed was set to 60 cm/min, and a force of $1.00 \times 10^3$ mN was applied on the surface of the antireflection film.

(7) Antiglare Property

First and second stimations of the antiglare properties were made to the 27 sorts of the obtained antireflection films. An SA: Kind of solution for antiglare layer SR: Specular Reflectance IR: Integral Reflectance H: Haze PH: Pencil Hardness CA: Contact Angle DF: Coefficient of Dynamic Friction 1AP: Antiglare Property in First Estimation 2AP: Antiglare Property in Second Estimation Table 4 teaches that the antireflection films produced in Examples 1-5 and Comparisons 1-4 were excellent in the antiglare property. Further, the color tint was low, and the evaluations of pencil hardness, the contact angle or the finger printing stain proofness, and the coefficient of dynamic friction were excellent. The antireflection films of Examples 1-5 were excellent in the antiglare property. However, mura including thickness-nonuniformity and the uneven coating was observed in the antireflection film produced in Comparisons 1-4.

Various changes and modifications are possible in the present invention and may be understood to be within the present invention.

What is claimed is:

1. A method for forming a film by casting on a front surface of a moving substrate at least one polymer solution discharged from a casting die, said method comprising steps of:
heating said substrate with use of a heater disposed along a back surface of said substrate; and
condensing solvent vapor for recovery of a solvent evaporated from said film with a condensing device disposed so as to closely confront to said film on said substrate.

2. A method as claimed in claim 1, wherein a wind speed near a surface of said film is from 0.01 m/s to 0.5 m/s.

3. A method as claimed in claim 2, wherein said substrate moves downwards at a casting position at which said flowing polymer solution contacts to said substrate.

4. A method as claimed in claim 1, wherein Tw is a surface temperature (° C.) of a confronting surface of said condensing device to said film, Ts is a temperature (° C.) of said film, and d is a distance (mm) from said condensing device to said film, and a temperature gradient Q satisfies following formulae (1) and (2):

$$Q=(Ts-Tw)/d \tag{1}$$

$$5<Q<100 \tag{2}.$$

5. A method as claimed in claim 4, wherein a fluctuation range of said temperature gradient Q is at most 10% of said temperature gradient Q.

6. A method as claimed in claim 5, wherein a fluctuation range of temperature on said confronting surface of said condensing device is at most 10° C.

7. A method as claimed in claim 6, wherein a fluctuation range of said distance d in widthwise direction of said substrate is at most 10% of an average of said distance d.

8. A method as claimed in claim 1, wherein co-casting of plural polymer solutions is made.

9. A method as claimed in claim 1, wherein a sequential casting of plural polymer solutions is made.

10. A method as claimed in claim 1, wherein a thickness of said film is from 10 μm to 1000 μm just after formation of said film on said substrate, and a relative speed of said substrate to said casting die is from 5 m/min to 200 m/min.

11. A method as claimed in claim 10, wherein said polymer contained in said polymer solution is at least one of cellulose acylate, polycarbonate, aramide resin, polysulfone, and polystyrene.

12. A method as claimed in claim 11, wherein a polymer solution contains cellulose acylate of at least 50 vol. % of polymer components, X is a ratio of substitution of acylate group at $6^{th}$ position of repeating unit in cellulose acylate, and Y is a ratio of substitution of said acylate group at other positions, and the following conditions are satisfied in said polymer solution:

$$X>0.85 \text{ and } 2.70<(X+Y)<2.99.$$

13. A method as claimed in claim 1, wherein said film is an optical film.

14. A method as claimed in claim 13, wherein said optical film is used in a polarizing filter.

15. A method as claimed in claim 13, wherein said optical film is used as a protective film for a polarizing filter.

16. A method as claimed in claim 13, wherein said optical film is used for an optical functional film.

17. A method as claimed in claim 13, wherein said optical film is used in a displaying device.

18. A method as claimed in claim 1, wherein after the heating and condensing steps, the method comprises peeling said film from said substrate and then drying said film.

19. A method as in claim 1, wherein the film is an optical polymer film.

20. A method as in claim 19, wherein the optical polymer film is for a polarizing filter.

21. A method as in claim 19, wherein the optical polymer film is for an optical functional film.

22. A method as in claim 19, wherein the optical polymer film is for a liquid crystal display.

* * * * *